United States Patent
Ali et al.

(10) Patent No.: US 8,509,779 B2
(45) Date of Patent: Aug. 13, 2013

(54) SYSTEM AND METHOD FOR REPORTING OF NEIGHBOUR CELLS IN HANDOVER FROM GAN

(75) Inventors: Syed Hussain Ali, Waterloo (CA); Noushad Naqvi, Waterloo (CA); Steven Michael Hanov, Waterloo (CA); Andrew John Farnsworth, Bromagrove (GB); Maiyuran Wijayanathan, Waterloo (CA)

(73) Assignee: Research In Motion Limited, Waterloo (CA)

(*) Notice: Subject to any disclaimer, the term of this patent is extended or adjusted under 35 U.S.C. 154(b) by 439 days.

(21) Appl. No.: 12/794,114

(22) Filed: Jun. 4, 2010

(65) Prior Publication Data
US 2011/0300866 A1    Dec. 8, 2011

(51) Int. Cl.
*H04W 36/00*    (2009.01)
*H04W 4/00*    (2009.01)

(52) U.S. Cl.
USPC ............... 455/436; 455/437; 370/331

(58) Field of Classification Search
None
See application file for complete search history.

(56) References Cited

U.S. PATENT DOCUMENTS

| | | | |
|---|---|---|---|
| 2008/0039086 A1 | 2/2008 | Gallagher et al. | |
| 2009/0061877 A1 | 3/2009 | Gallagher | |
| 2010/0142483 A1* | 6/2010 | Wu et al. | 370/331 |
| 2010/0255846 A1* | 10/2010 | Vikberg et al. | 455/436 |

FOREIGN PATENT DOCUMENTS

| | | |
|---|---|---|
| WO | 03045104 | 5/2003 |
| WO | 2009112413 | 9/2009 |

OTHER PUBLICATIONS

"3rd Generation Partnership Project; Technical Specification Group Radio Access Network; Radio Resource Control (RRC); Protocol Specification (Release 8)", 3GPP TS 25.331 V8.8.0, Sep. 2009, 1697 pages in total.

"3rd Generation Partnership Project; Technical Specification Group GSM/EDGE Radio Access Network; Generic Access Network (GAN); Stage 2 (Release 8)", 3GPP TS 43.318 V8.4.0, Feb. 2009, 127 pages in total.

"3rd Generation Partnership Project; Technical Specification Group GSM/EDGE Radio Access Network; Mobile radio interface layer 3 specification; Radio Resource Control (RRC) protocol (Release 8)", 3GPP TS 44.018 V8.9.0, Dec. 2009, 426 pages in total.

"3rd Generation Partnership Project; Technical Specification Group GSM/EDGE Radio Access Network Generic Access Network (GAN); Mobile GAN interface layer 3 specification (Release 8)", 3GPP TS 44.318 V8.6.0, Sep. 2009, 246 pages in total.

(Continued)

*Primary Examiner* — Erika A Washington
(74) *Attorney, Agent, or Firm* — Novak Druce Connolly Bove + Quigg LLP

(57) ABSTRACT

Methods are described for use in a mobile device such that when the mobile device is connected to a generic access network (GAN) cell, the mobile device receives information including characteristics pertaining to one or more neighbor cells in a network that are not GAN cells. The mobile device can then determine at least a list of candidate neighbor cells for handover from the GAN cell to a cell that is not a GAN cell as a function of the information. In some embodiments of the invention the network that is not a GAN is a UTRAN network and a candidate list of 3G cells are generated.

20 Claims, 12 Drawing Sheets

(56) References Cited

OTHER PUBLICATIONS

"Universal Mobile Telecommunications System (UMTS); Radio Resource Control (RRC); Protocol specification (3GPP TS 25.331 version 9.2.1 Release 9)", Technical Specification, European Telecommunications Standards Institute (ETSI), vol. 3GPP RAN 2, No. V9.2.1, May 1, 2010, p. 83.

"Digital Cellular Telecommunications System (Phase 2+); Generic Access Network (GAN); Stage 2 (3GPP TS 43.318 version 9.0.0 Release 9)", Technical Specification, European Telecommunications Standards Institute (ETSI), No. V9.0.0, Feb. 1, 2010, pp. 311 and 312.

European Search Report for corresponding European Patent Application No. 10165019.0, date of completion: Oct. 4, 2010, 2 pages in total.

3GPP TS 43.129 V8.2.0, "3GPP Technical Specification Group GSM/EDGE Radio Access network, Packet-switched handover for GERAN A/Gb mode, Stage 2", Release 8, V8.2.0, Nov. 2009, 93 pages.

International Search Report and Written Opinion for corresponding PCT Patent Application No. PCT/CA2011/050342, Aug. 18, 2011, 9 pages.

ETSI TS 144 318 v9.2.0 "Digital Cellular Telecommunications System (Phase 2+); Generic Access Network (GAN); Mobile GAN interface layer 3 specification (3GPP TS 44.318 version 9.2.0 Release 9)", 28 pages, published Mar. 2010.

Communication Pursuant to Article 94(3) EPC for corresponding European Patent Application No. 10165019.0, issued on Sep. 27, 2012, 6 pages.

\* cited by examiner

SYSTEM AND METHOD FOR REPORTING OF NEIGHBOUR CELLS IN HANDOVER FROM GAN

TECHNICAL FIELD

The application relates to handover of a mobile device from GAN to UTRAN.

BACKGROUND

3GPP has standardized the mobility procedures between Generic Access Network (GAN) and cellular cells. One such procedure is "CS Handover from GAN". In this procedure, the User Equipment (UE) in GAN mode with an active voice call initiates handover procedure to the cellular network by providing lists of neighbor candidate cells. The UE may for example be a mobile terminal such as, but not limited to a cellular telephone, a personal data assistant (PDA), or a wirelessly enabled computer. There may be two lists of candidate cells; one list consisting of 2G cells and the other consisting of 3G cells. Each list is sorted in the descending order of measured signal strengths for the candidate cells included in the list. The procedure allows reporting of the 2G list or the 3G list, or both the 2G and 3G lists. The procedure requires reporting of mobile country code (MCC), mobile network code (MNC), location area code (LAC) and Cell ID information for every cell in the candidate list.

If the UE prefers that the handover is to be initiated to a 3G (i.e. UMTS Terrestrial Radio Network (UTRAN)) cell, the UE has to report 3G neighbour cells in a candidate cell list for handover. In general the UE does not know all the required information about neighbourhood cells except the cell to which the UE's cellular Access Stratum (AS) is camping on in a "detached" state. The detached state occurs when the UE camps on GAN (i.e. higher layers are mapped to GAN AS) and one of its cellular AS receives cell broadcast information from one of the cellular cells.

Neighbour cell information in UTRAN is provided to the UE by one or more of System Information Block (SIB) 11, SIB 12 and SIB 11bis. The neighbour cell information includes UTRA Absolute Radio Frequency Channel Numbers (UARFCN) (for inter-frequency cells) and primary scrambling codes (PSC) (for inter-frequency and intra-frequency cells) for the neighbour cells. Using UARFCN and PSC of the 3G neighbour cells, the UE can generate a 3G candidate cell list for handover. The process involves synchronizing with each neighbour cell, measuring the neighbour cell signal strength and decoding Master Information Block (MIB) and SIB block information such as from SIB 1 or SIB 3, or both. The MIB contains MCC and MNC information, LAC information is provided in SIB 1 and Cell ID information is provided in SIB 3. This process is repeated for one or more cells in the neighborhood. Once the information is available for several 3G cells, then the UE sorts the list of cells in descending order of their measured signal strength and sends the list of 3G candidate cells to the Generic Access Network Controller (GANC). This process takes time and may put considerable processing load on the UE.

Furthermore, the GAN Controller (GANC), according to 3GPP Release 8 or earlier, does not announce its handover capability (implicitly or explicitly) to the UE. It is possible that a GANC is not capable of handover to 3G cells. In such a case, if the UE reports only a 3G candidate list then handover will not proceed. This may delay the handover. Therefore, for 3GPP Release 8 or earlier it is advisable for the UE to report a 2G candidate list along with the 3G candidate list in order to increase the chances of a successful handover. Sending both a 2G candidate list and 3G candidate list puts additional burden on the processing of the UE. The processing overhead becomes acute because of the possibility of rapid drop in the GAN signal quality which can result in a call being dropped before the UE furnishes the required candidate cell lists.

If the UE prefers that the handover is initiated to a GERAN cell instead of a 3G cell and the UE's GERAN AS is in the detached state, then the UE can provide several GERAN cells in the candidate cell list. There is less processing required from the UE because generating a 2G candidate cell list is easier than generating a 3G candidate cell list, and there is no need to report a 3G candidate list when handing over to a GERAN cell.

BRIEF DESCRIPTION OF THE DRAWINGS

Embodiments of the application will now be described with reference to the attached drawings in which.

DETAILED DESCRIPTION

Figure 1:
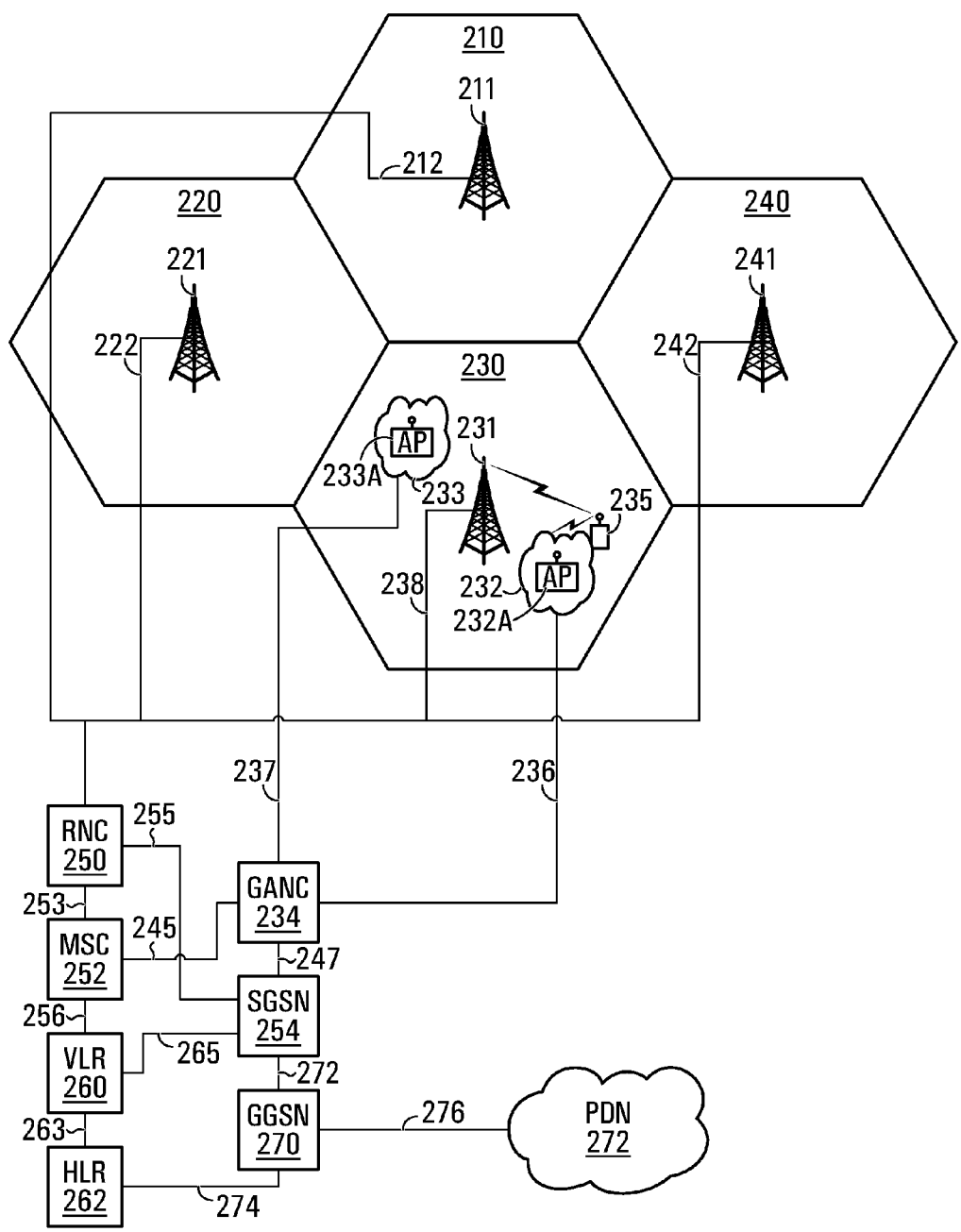
FIG. 1 is a schematic diagram of a telecommunication cell over which aspects of the application may be implemented.

In the following detailed description of sample embodiments, reference is made to the accompanying drawings, which form a part hereof, and in which is shown by way of illustration specific sample embodiments. These embodiments are described in sufficient detail to enable those skilled in the art to practice the embodiments, and it is to be understood that other embodiments may be utilized and that logical, mechanical, electrical, and other changes may be made without departing from the scope of what is described in the application. The following detailed description is, therefore, not to be taken in a limiting sense, and the scope is defined by the appended claims.

According to a first aspect, there is provided a method for use in a mobile device comprising: when the mobile device is connected to a generic access network (GAN) cell, receiving information comprising characteristics pertaining to one or more neighbour cells in a network that are not GAN cells; determining at least a list of candidate neighbour cells for handover from the GAN cell to a cell that is not a GAN cell as a function of the information.

In some embodiments determining at least a list of candidate neighbour cells for handover from the GAN cell to a cell that is not a GAN cell as a function of the information comprises determining at least a list of candidate 3G cells for handover from the GAN cell to a cell that is not a GAN cell as a function of the information In some embodiments determining a list of candidate 3G cells for handover comprises: reducing the number of neighbour cells available to be included in the list of candidate 3G cells based on signal quality of the neighbour cells.

In some embodiments the method further comprises: extracting UTRAN absolute radio frequency channel number (UARFCN) information and primary scrambling code (PSC) information from SIB 11 and SIB 11Bis broadcast by at least one 3G cell to identify neighbour cells and create a neighbour cell list; determining signal quality of at least one neighbour cell on the neighbour cell list; excluding any 3G cells having a signal quality less than the minimum threshold value from a potential 3G candidate cell list; once a potential candidate 3G cell list has been identified comprising neighbouring 3G cells that have been identified having a signal quality greater than the minimum threshold value, decoding information pertaining to the cells on the potential candidate 3G cell list; generating the list of candidate 3G cells as a function of information determined about potential candidate 3G cells.

In some embodiments the method further comprises: determining if signal quality of a 3G cell upon which the mobile device is camped in a detached state is a) greater than a threshold value and b) not restricted for use by the mobile terminal; when the signal quality is less than the threshold value or the 3G cell is restricted for use by the mobile terminal: extracting UTRAN absolute radio frequency channel number (UARFCN) information and primary scrambling code (PSC) information from SIB 11 and SIB 11Bis broadcast by the network; once neighbour cells are identified, for at least one of the neighbour cells, decoding information pertaining to the at least one neighbour cell; determining signal quality of the at least one neighbour cell based on decoded information; and generating the list of candidate 3G cells as a function of information determined about the at least one neighbour cell; and when the signal quality is greater than the threshold value and the 3G cell is not restricted, generating the list of candidate 3G cells that includes only the 3G cell upon which the mobile device is camped in a detached state.

In some embodiments determining a list of candidate 3G cells for handover comprises: reducing the number of neighbour cells available to be included in the list of candidate 3G cells based on a determination of whether a neighbour cell is restricted from use by the mobile device.

In some embodiments the method further comprises: extracting UTRAN absolute radio frequency channel number (UARFCN) information and primary scrambling code (PSC) information from SIB 11 and SIB 11Bis received from the 3G cell upon which the mobile device is camped in a detached state to identify neighbour cells and create a neighbour cell list; once a neighbour cell list has been created, decoding information pertaining to the neighbour cells receiving and decoding information pertaining to access restrictions from SIB 3 information; excluding any 3G cells that are restricted to access the mobile device from a potential candidate 3G cell list; determining signal quality of at least one neighbour cell on the potential candidate 3G cell list; generating the candidate 3G cell list as a function of information determined about the cells on the potential candidate 3G cell list.

In some embodiments the method further comprises: determining if a mobile device is being used; determining if the mobile device should initiate acquiring neighbour 3G cell information at that time; if it is determined that the mobile device should initiate acquiring neighbour 3G cell information, initiating acquiring neighbour 3G cell information at that time; and determining the candidate 3G cell list based on the acquired 3G cell information.

In some embodiments the method further comprises: determining if a handover trigger occurs within a defined duration; when a handover trigger occurs within a defined duration furnishing the candidate 3G cell list to the GANC in a handover information message; when a handover trigger does not occur within a defined duration repeating the initiating acquiring neighbour 3G cell information for any updates from the previous acquisition of neighbour 3G cell information; and determining the candidate 3G cell list based on the updated acquired 3G cell information.

In some embodiments the method further comprises: performing a background cell scan to find neighbour 3G cells; once neighbour 3G cells are identified, for at least one of the neighbour 3G cells, decoding information pertaining to the at least one neighbour 3G cell; generating the list of candidate 3G cells as a function of information determined about the at least one neighbour 3G cell.

In some embodiments the method further comprises: if a neighbour 3G cell is not discovered during a first predetermined duration, temporarily suspending performing the background cell scan for neighbour 3G cells for a second predetermined duration; and upon expiry of the second predetermined duration, resume performing the background cell scan to find neighbour 3G cells.

In some embodiments receiving information comprising characteristics pertaining to one or more neighbour cells comprises: the mobile device requesting the information from a GAN controller (GANC); receiving the information from the GANC.

In some embodiments requesting the information comprises sending a message that uniquely identifies a UTRAN cell upon which the mobile device is camped in a detached state.

In some embodiments the method further comprises: generating a neighbour 3G cell list based at least in part on the information received from the GANC; decoding information pertaining to the neighbour 3G cells; determining signal quality of neighbour 3G cells that have been identified as neighbour 3G cells by the GANC; generating a list of candidate 3G cells as a function of information determined about neighbour 3G cells.

In some embodiments the GAN network is any one of: a Wi-Fi network; WiMAX network; a BlueTooth network and an Infrared network.

In some embodiments receiving information comprises receiving information in the form of at least one of: a master information block (MIB), system information block (SIB) 1, SIB 3, SIB 11, SIB 11Bis and SIB 18.

In some embodiments generating the list of 3G candidate cells for handoff occurs as a result of receiving: a) local measurements of GAN coverage signal quality are above or below a predetermined threshold; b) reception of a message indicating the uplink quality is below a desired threshold; c) reception of one or more Real-Time Control Protocol (RTCP)

packets indicating a poor uplink quality; d) excessive loss or delay in received Real-time Transport Protocol (RTP) packets; and e) UTRAN becomes available, desirable or both and the mobile device is in a "cellular preferred" mode.

In some embodiments the list of candidate 3G cells for handoff is provided to a GAN controller (GANC) in a handover information message.

In some embodiments the method further comprises the GAN operating in one or more of: a GAN a/Gb mode and a GAN Iu mode.

According to a second aspect, there is provided a mobile device comprising: at least one wireless access radio configured to: receive information broadcast by at least a generic access network (GAN) and a network that is not a GAN comprising characteristics pertaining to one or more telecommunication cells in the network that is not a GAN cell; at least one processor configured to: determine a list of candidate cells for handover from a GAN cell to a cell that is not a GAN cell as a function of the information broadcast by at least one of the GAN and the network that is not a GAN.

In some embodiments the network that is not a GAN is a UTRAN network and the cell that is not a GAN cell is a 3G cell of the UTRAN network.

In some embodiments the GAN network is any one of: a Wi-Fi network; WiMAX network; a BlueTooth network and an Infrared network.

In some embodiments the mobile device is further configured to: perform background cell scans to find neighbouring cells; if a neighbour 3G cell is not discovered during a first predetermined duration, temporarily suspending performing the background cell scan for neighbour 3G cells for a second predetermined duration; and upon expiry of the second predetermined duration, resume performing the background cell scan to find neighbour 3G cells; once neighbouring cells are located, for at least one of the neighbouring cells, the processor is configured: to decode information pertaining to the neighbouring cell; generate the list of candidate cells as a function of information determined about neighbouring cells.

In some embodiments the list of candidate cells for handoff occurs as a result of the mobile terminal receiving: a) local measurements of GAN coverage signal quality are above or below a predetermined threshold; b) reception of a message indicating the uplink quality is below a desired threshold; c) reception of one more Real-time Control Protocol (RTCP) packets indicating a poor uplink quality; d) excessive loss or delay in received Real-time Transport Protocol (RTP) packets; and e) UTRAN becomes available, desirable (i.e. the signal quality is good enough for normal operation) or both and the mobile device is in a "cellular preferred" mode, meaning that UTRAN communication is a preferred network for communication.

In some embodiments the at least one wireless access radio is configured to provide a list of candidate cells for handoff to a GAN controller (GANC) in a handover information message.

In some embodiments information broadcast by the GAN and UTRAN comprises information in the form of at least one of: a master information block (MIB), system information block (SIB) 1, SIB 3, SIB 11, SIB 11Bis, and SIB 18.

According to a third aspect, there is provided a method for use in a generic access network controller (GANC) comprising: receiving a first request from a mobile device for information regarding neighbour cells that are not GAN cells; transmitting a second request to a network node in order to obtain information regarding neighbour cells that are not GAN cells; receiving a first response to the second request including information regarding neighbour cells that are not GAN cells; transmitting a second response to the mobile device including information regarding neighbour cells that are not GAN cells.

A device on which some embodiments of the application may operate is a wireless, mobile device. This has been referred to above as user equipment (UE). The device may for example be, but is not limited to: a cellular telephone; a personal data assistant (PDA); or a wirelessly enabled computer. For consistency the device will be referred to herein as a mobile device.

When the mobile device operates in UTRAN, neighbour cell information is provided to the mobile device in one or more of SIB 11, SIB 11Bis and SIB 12 messages. The mobile device measures neighbour cells periodically or at the occurrence of particular events. Such measurements may be configured by SIB information or by a radio resource control (RRC) MEASUREMENT CONTROL message. The neighbour cell information provided to the mobile device is valid when the UTRAN access stratum (AS) is in communication with a UTRAN cell that is currently serving the mobile device, which may be referred to as the UTRAN AS being connected in an "active state". The information may be used for UTRAN to UTRAN handovers and UTRAN to GERAN handovers. However, when operating in a GAN and handing over from the GAN to UTRAN, the information received through SIB 11, SIB 11Bis and SIB 12 information has not conventionally been utilized because the UTRAN AS is not actively communicating with the UTRAN cell, but it is capable of receiving information from the UTRAN cell. As such the UTRAN AS is considered to be in a detached state.

A neighbour cell list for handover between UTRAN cells is handled through SIB 11/11bis/12 information when the UTRAN AS is in active state. In the active state, non-access stratum (NAS) layers are connected to the UTRAN cell. The cells to be measured and when to measure those cells may be handled through the SIB information or through the use of special radio resource control (RRC) MEASUREMENT CONTROL messages, or both. The measurement may be network controlled. The measurement may be periodic. The measurement may be event based.

However, using SIB 11/11bis/12 information is not typically used when in a GAN and preparing to handover from GAN to UTRAN because the UTRAN AS is in the detached state instead of an active state, as described above. Furthermore, for event based measurements for events such as, but not limited to, intra frequency reporting events, inter-frequency reporting events, inter-radio access technology (RAT) reporting events, RRC events are not mapped to triggers, some examples of which are describe below that initiate handover from the GAN. Therefore, a solution for generating a candidate cell list for a GAN to UTRAN handoff is different than the conventional manner of a UTRAN cell to UTRAN cell handoff, and as such requires modifications from conventional operation in order to enable GAN related triggers to initiate neighbourhood measurements and allow the mobile device to perform intra-frequency measurements, inter-frequency measurements and inter-RAT measurements as if the mobile device were in a connected state in UTRAN.

An example of a network over which embodiments of the application may be implemented will now be described with reference to FIG. 1. In FIG. 1 four adjacent cells 210,220, 230,240 are illustrated. Each of the cells may include multiple overlayed systems within each respective cell. In FIG. 1 the four cells each at least broadcast as part of a 3G UTRAN network. Each cell has a respective base station 211,221,231, 241, referred to as a NodeB in a UMTS system. The four adjacent cells form part of an overall network, of which only the four cells are shown. Each of the NodeBs 211,221,231, 241 are connected to a radio network controller (RNC) 250 by interfaces 212,222,238,242. The RNC 250 is connected to a Mobile Switching Center (MSC) 252 by interface 253 and a Serving General Packet Radio Service (GPRS) Support Node (SGSN) 254 by interface 255. The MSC 252 is connected to a Visitor Location Register (VLR) 260 by interface 256. The VLR 260 is connected to a Home Location Register (HLR) 262 by interface 263 and the SGSN 254 by interface 265. The SGSN 254 is connected to a Gateway GPRS Support Node (GGSN) 270 by interface 272. The GGSN 270 is connected to the HLR 262 by interface 274 and a public data network (PDN) 272 by interface 276. An example of PDN 272 is the internet.

In cell 230 there are two GAN cells 232,233. Each GAN cell 232,233 has an access point (AP) 232A,233A. A mobile device 235 is shown to be within the coverage area of GAN cell 232. Each of APs 232A,233A are connected to a GAN controller (GANC) 234 by interfaces 236 and 237. The GANC 234 is connected to the MSC 252 by interface 245 and the SGSN 254 by interface 247.

In operation, the mobile device 235 can handoff from the UTRAN in cell 231 to the GAN cell 232 and vice versa as the mobile device moves within cell 230. When communicating over the UTRAN, the mobile device 235 communicates wirelessly with base station 231. In a UMTS 3G network this interface may be known as Uu. NodeB 231 communicates with the RNC 250 over interface 238 and from RNC 250 with either of MSC 252 or SGSN 254, or both, over interfaces 253 or 255 respectively. In a UMTS 3G network the communication interface between the Node B and the RNC may be known as IuB, the communication interface between the RNC and the SGSN may be known as Iu-PS and the communication interface between RNC and the MSC may be known as Iu-CS.

When communicating over the GAN, the mobile device 235 communicates wirelessly with AP 232A. AP 232A communicates with GANC 234 over interface 236, and from the GANC 234 to either of the MSC 252 or the SGSN 254, or both, over interfaces 245 or 247 respectively. In a 3G network the communication interface between AP and the GANC may be known as Up, the communication interface between the GANC and the SGSN may be known as Gb/1uPS and the interface between GANC and the MSC may be known as A/1u-CS.

While FIG. 1 is a particular example of a UMTS system architecture on which aspects of the present application may operate, it is to be understood that additional architectures may be overlaid on the cellular architecture of FIG. 1. For example in a GSM system, the NodeBs 211,221,231,241 of FIG. 1 are referred to as base stations and the RNC 250 is referred to as a base station controller (BSC). Each of the base stations are connected to the BSC by respective interfaces known as Abis. The interface between the BSC and the SGSN may be known as Gb and the interface between BSC and the MSC may be known as A.

In some implementations the GAN that is handing over to the UMTS cell may be connected to the core network via a GSM interface, which is referred to as GAN A/Gb mode. In some implementations the GAN that is handing over to the UMTS cell may be connected to the core network via a UMTS interface, which is referred to as GAN Iu mode.

3GPP specifications and some network implementations allow a mobile device to be camped on a GAN while at least one of the mobile device's cellular Access Stratum (AS), i.e. GERAN or UTRAN, is considered to be in a detached state. If at least one of the mobile device's cellular AS is in the detached state, the mobile device continues to receive System Information Blocks (SIB) from a 3G cell, as it is in close enough proximity to receive signals broadcast by the 3G cell, and determine the signal quality of the 3G cell as if the mobile device is camped on that cell. In some embodiments determining the signal quality may include measuring the signal strength. During the detached state the mobile device is still receiving SIB information from the 3G cell, even though the mobile device is operating on the GAN.

However, Non-Access Stratum (NAS) layers, for example, but not limited to, Mobility Management (MM), Connection Management (CM) and Session Management (SM) are disconnected from the UTRAN AS and connected to the core network through GAN AS. When at least one of the mobile device's cellular AS is considered to be in the detached state with respect to the 3G cell, the mobile device is aware of the cell identifier and corresponding signal quality value, such as for example $E_c/N_o$, of the 3G cell in the neighbourhood of the GAN that the mobile device is camped on in the detached state.

When in GAN mode, the mobile device can establish or receive voice calls over a generic access connection. An example of a generic access connection is a Wi-Fi connection. Other current examples of GAN include, but are not limited to, WiMAX and BlueTooth. In some embodiments, the GAN is any technology that provides IP connectivity to a GAN controller. It is to be understood that future GAN may also benefit from the embodiments described herein and be considered within the scope of the application.

Examples described below will assume the GAN is connected to the core network via a GSM interface and is therefore in the GAN A/Gb mode. It is to be understood however that the GAN could operate in the GAN Iu mode as several examples provided closer to the end of the application will illustrate.

In some embodiments during an active voice call, the mobile device may be considered to be in a generalized access circuit switched resource (GA-CSR) DEDICATED state. In this state, the mobile device can initiate a handover to the UTRAN cellular network when a trigger such as, but not limited to, the following occur: a) local measurements of GAN coverage signal quality are above or below a predetermined threshold; b) reception of a GA-CSR UPLINK QUALITY INDICATION message indicating the uplink quality from the mobile device to the GANC is below a desired threshold for satisfactory transmission; c) reception of one or more Real-time Control Protocol (RTCP) packets indicating a poor uplink quality; d) excessive loss or delay in received Real-time Transport Protocol (RTP) packets; and e) UTRAN becomes available, desirable (i.e. the signal quality is good enough for normal operation) or both and the mobile device is in a "cellular preferred" mode, meaning that UTRAN communication is a preferred network for communication.

In some embodiments, as a part of a handover procedure from GAN to UTRAN, the mobile device sends a handover information message to the GANC. In the message the mobile device may send a list of at least one candidate cell identifier ranked in descending order of candidate cell signal quality measurements for candidate cells associated with the candidate cell identifiers. In some embodiments the signal quality measurement may be a signal strength measurement such as $E_c/N_o$ or RSCP. In some embodiments the handover message may be a generalized access circuit switched resource (GA-CSR) HANDOVER INFORMATION message. If handover to a UTRAN cell is initiated, which for example may occur as a result of at least one of the triggers mentioned above, the handover information message may include a UTRAN cell identifier list and corresponding $E_c/N_o$ and RSCP values. The UTRAN cell identifier for each of the neighbouring UTRAN cells includes of at least some of the following parameters: mobile country code (MCC); mobile network code (MNC); location area code (LAC); and 3G Cell Identity.

To generate a 3G candidate cell list to be included in the handover information message, the mobile device needs neighbourhood cell information. The mobile device may get this information from one or more of SIB 11 and SIB 11Bis broadcast by the 3G cell and received by the mobile station having at least one AS in a detached state. From these SIBs, the mobile device comes to know the UARFCN (for inter-frequency cells) and PSC (for intra-frequency and inter-frequency cells) of other neighbour cells. Then the mobile device synchronizes to each cell and decodes some or all of information from one or more of MIB, SIB 1 and SIB 2 messages to get cell identifiers. The mobile device also measures neighbour cell $E_c/N_o$ values and sorts them in descending order. The mobile device sends this list of neighbour cells as a candidate cell list to the GANC in a handover information message.

A neighbour cell list is a list of cells that are neighbour cells to the GAN cell. A candidate cell list is a list of neighbour cells that are candidates for handoff. In some embodiments the candidate cell list is a subset of the neighbour cell list. For example, the candidate cell list may include only a single cell, which might be the UTRAN cell upon which the mobile device is camped in a detached state. In other implementations, the candidate cell list may include more than one cell, but less than the total number of cells in the neighbour cell list. In some implementations, the number of cells in the candidate cell list may be equal to the number of cells in the neighbour cell list. In some embodiments, reducing the number of cells that are in the neighbour cell list when generating the candidate cell list may reduce the processing load of the mobile device. Different examples of reducing the number of neighbour cells when generating the candidate cell list are described below.

In some implementations, the UTRAN neighbour cell information is provided to a mobile device through a SIB 18 message block when the mobile device's UTRAN AS is in a detached state.

GAN signal strength can change rapidly. As described above, the mobile device has to perform considerable processing to gather all the information. This processing, if not performed at an appropriate time, can delay the handover, which may result in a call being dropped. The timing of generating the candidate cell list may be relevant because GAN signal strength can drop rapidly resulting in insufficient time for the mobile device to furnish the complete candidate cell lists of both 2G and 3G cells.

Multiple techniques will now be described to reduce processing load on the mobile device or advance the processing to generate the 3G candidate cell list, or both. A first technique involves acquiring information that may be used to generate the candidate cell list prior to when the candidate cell list information is needed, such as triggering events described above. A second technique involves reducing the number of neighbour cells that may potentially be added to a candidate cell list based on a threshold value prior to finalizing the candidate cell list. For example, a measured signal strength of a neighbour cell may be compared to the threshold value and including the neighbour cell on the candidate cell list if appropriate. A third technique involves determining restriction requirements for using neighbour cells prior to generating the candidate cell list and including the neighbour cells if appropriate. A fourth technique involves scanning the spectrum in a search for additional neighbour cells to supplement the neighbour cell list. A fifth technique involves soliciting neighbour cell information from the GANC with which the mobile device is in communication with at that time.

Figure 2:
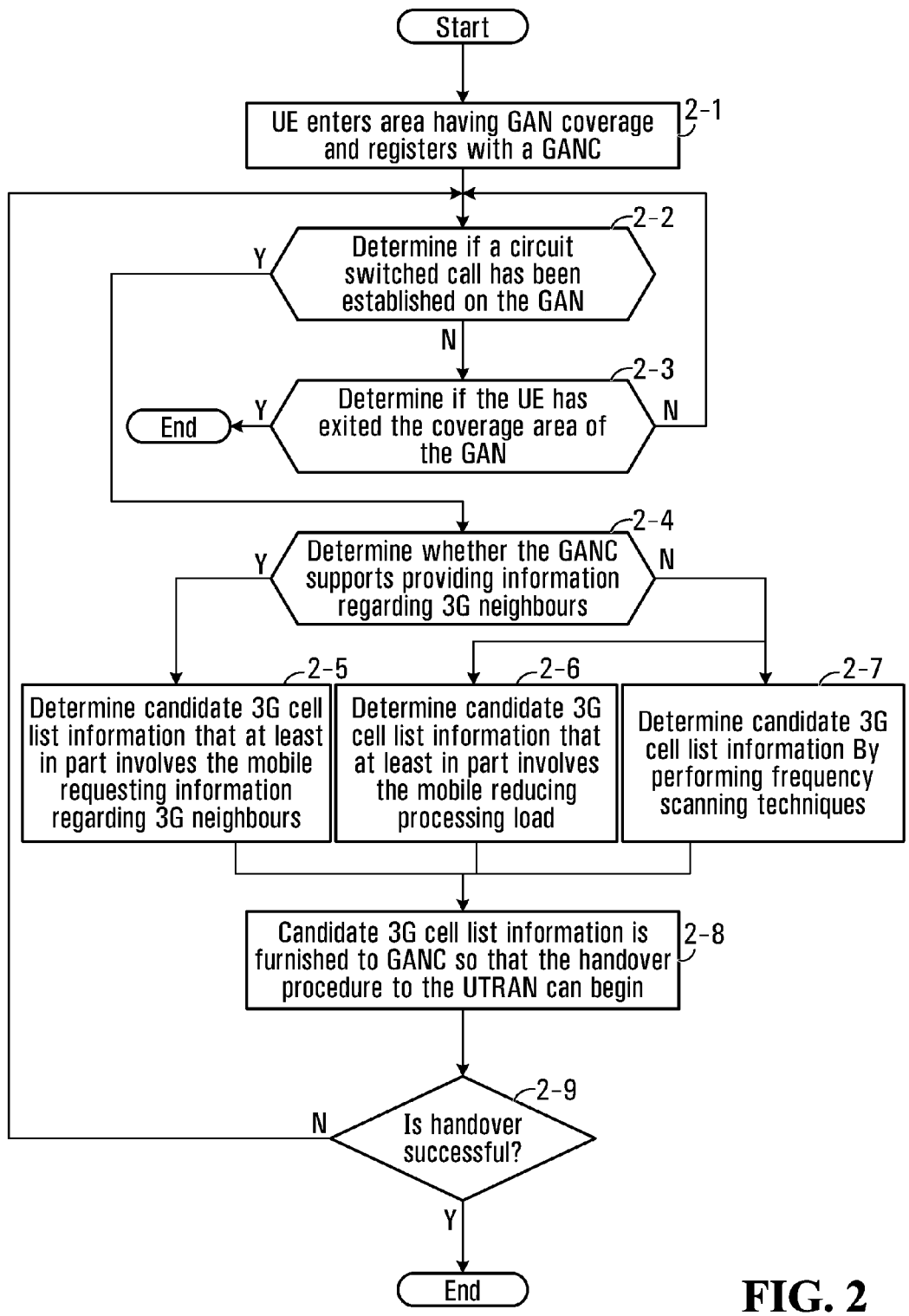
FIG. 2 is a flow chart illustrating an example of a method for generating handover information when handing over from a GAN to a UTRAN.

An example of a general method for providing candidate cell list information from a mobile device operating on a GAN during handover to a UTRAN will now be described with regard to FIG. 2.

In a first step 2-1 the mobile device enters an area in which there is GAN coverage. This may be a Wi-Fi hotspot or an area of WiMAX coverage, BlueTooth coverage or Infrared coverage, to list but a few non-limiting examples. The mobile device registers with a GAN controller (GANC). Once having registered with the GANC, the mobile device may be considered to be in a generalized access radio control registered state (GA-RC-Registered state).

A second step 2-2 involves determining if a circuit switched (CS) call has been established on the GAN. In some embodiments, determining a CS call has been established involves determining if the mobile device is in a generalized access circuit switched resource dedicated (GA-CSR-Dedicated) state. If no circuit switched call has been established on the GAN (no path of step 2-2), step 2-3 involves determining if the mobile device has exited the coverage area of the GAN. If the mobile device has not exited the coverage area of the GAN (no path of step 2-3), the mobile device returns to step 2-2. If the mobile device has exited the coverage area of the GAN (yes path of step 2-3), the mobile device enters a GA-RC Deregistered state and the method is completed.

In some embodiments, when determining if a CS call has been established on the GAN it is also determined if there is a possibility of a handover occurring from the GAN cell to a non-GAN cell. Most of the time when a user is stationary a handover is not needed and therefore to avoid performing the method when it may not be desirable or to avoid unnecessary processing, it may not be desirable to be constantly performing the remainder of the steps described below. In some embodiments, determining if there is a possibility of a handover occurring from the GAN cell to a non-GAN cell may involve determining if any triggers have either initiated a handoff or the values required to cause a trigger to initiate a handoff are within a given range of a threshold such that it is likely a handoff may be imminent.

Referring back to step 2-2, if a circuit switched call has been established on the GAN then the mobile device is considered to be in the GA-CSR-Dedicated state. A further step 2-4 involves determining whether the GANC supports providing information regarding 3G neighbour cells. In some embodiments, advancing to step 2-4 may be dependent upon the determination if there is a possibility of a handover occurring from the GAN cell to a non-GAN cell. If it is determined that the GANC does support providing information regarding 3G neighbour cells (yes path of 2-4), a further step involves determining candidate 3G cell list information 2-5 that at least in part involves the mobile device requesting information from the GANC regarding 3G neighbour cells. An example of this will be detailed below with reference to FIG. 7.

If it is determined that the GANC does not support providing information regarding 3G neighbour cells (no path of step 2-4), a further step involves determining candidate 3G cell list information 2-6 that at least in part involves the mobile device attempting to reduce its processing load. Several examples of this will be described below with reference to FIGS. 3, 4A, 4B and 5.

If it is determined that the GANC does not support providing information regarding 3G neighbour cells (no path of step 2-4), another possible step 2-7 involves determining candidate 3G cell list information by performing frequency scanning techniques to find 3G cells based on their operating frequency. In some embodiments, performing frequency scanning techniques may be used in conjunction with step 2-6. In some embodiments, performing frequency scanning techniques may be used as an alternative to step 2-6.

Upon completion of method steps 2-5, 2-6 or 2-7, candidate 3G cell list information is furnished to the GANC in a handover information message, step 2-8, so that the handover procedure to the UTRAN cell can begin when appropriate.

Step 2-8 involves determining if the handover was successful. If the handover was successful (yes path of step 2-8), the method is successfully completed. If the handover was not successfully completed (no path of step 2-8), the method returns to step 2-2.

While the above paragraphs describe a 3G cell, more generally the description applies to any type of non-GAN network and more specifically a non-GAN cell in place of the 3G cell and procedures where technology specific cell broadcast messages are used to generate a candidate cell list. In some embodiments, the non-GAN network is any one of a UTRAN, a GERAN, and a Long Term Evolution (LTE) network. The network that is not a GAN can employ any form of cell structure, for example, but not limited to, a macro cell structure, a pico cell structure or a femto cell structure.

Acquiring Candidate Cell Information Before Handover Required

Generally, a mobile device starts acquiring candidate cell list information when one or more handover triggers occur. However, this delays the generation of the candidate cell list and puts additional processing load on the mobile device at a time when handover is potentially imminent, or example when WiFi signal strength has already started to degrade. In some embodiments, generating a candidate cell list may be triggered earlier than when the candidate cell list is needed, for example, but not limited to, when a call on the mobile device is connected or when a user starts to use the mobile device. Examples of using the mobile device may include, but are not limited to, opening an application on the mobile device or searching contact information for contacts that a user of the mobile device may wish to communicate.

In some embodiments, the mobile device uses information received in the neighbour cell list provided in one or more of SIB 11 and SIB 11bis from the UTRAN cell when at least one of the mobile device's cellular AS is in the detached state to synchronize to one or more of the neighbour cells. Once synchronized, the mobile device may decode information from the respective one or more neighbour cells to obtain cell identifier information. SIB 11 and SIB 11bis information may contain UARFCNs (for inter-frequency cells) and PSCs for some or all neighbour cells listed in these message blocks. The information that is decoded may include one or more of: common pilot channel (CPICH) information, Master Information Block (MIB) information and SIB information of the neighbouring cells. The decoded information may include LAC information, for example that is provided in SIB 1, and Cell ID information, for example that is provided in SIB 3.

Generating the candidate 3G cell list before it is actually needed allows more time for the mobile device to generate the candidate cell list. Therefore, when handover triggers occur the mobile device can furnish the candidate cell list more quickly then if the mobile device has to generate the list in response to a specific request for the candidate cell list information. The information provided by one or more of SIB 11 and SIB 11bis may assist the mobile device in generating the neighbouring candidate 3G cell list more quickly than if the mobile device had to perform a background scan for neighbour cells and decode information such as CPICH information, MIB information and SIB information.

Figure 3:
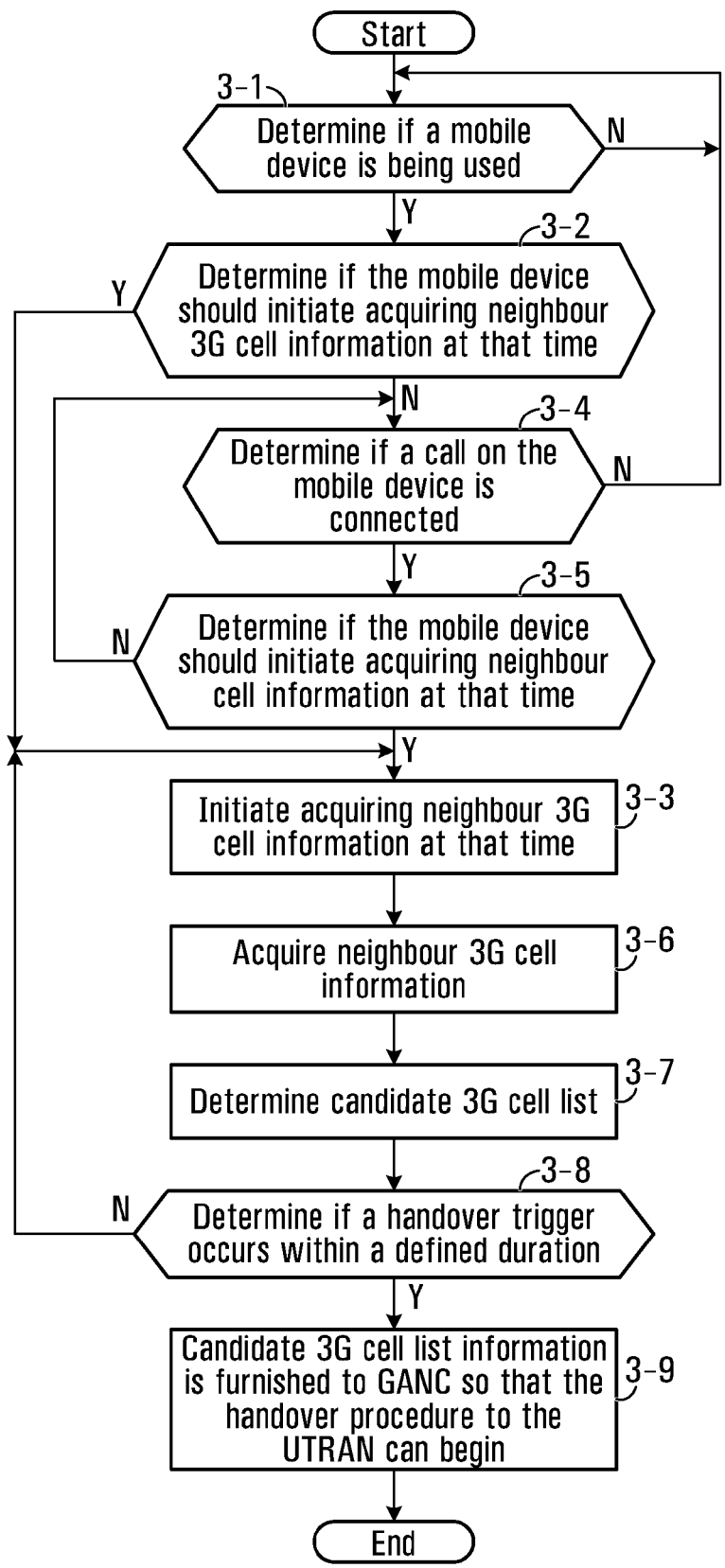
FIG. 3 is a flow chart illustrating an example of a method for generating handover information when handing over from a GAN to a UTRAN.

An example of acquiring candidate cell information before handover is required as a result of a triggering event will now be described with reference to FIG. 3. A first step 3-1 involves determining if a mobile device is being used. If the mobile device is not being used (no path of 3-1), the method returns to step 3-1. If the mobile device is being used (yes path of 3-1), a further step 3-2 involves determining if the mobile device should initiate acquiring candidate 3G cell information at that time. If it is determined that the mobile device should initiate acquiring candidate cell information at that time (yes path of step 3-2), a further step 3-3 involves the mobile device initiating acquiring neighbour 3G cell information at that time. If it is determined that the mobile device should not initiate acquiring candidate cell information at that time (no path of step 3-2), a further step 3-4 involves determining if a call on the mobile device is connected. If it is determined a call on the mobile device is connected (yes path of 3-4), a further step 3-5 involves determining if the mobile device should initiate acquiring neighbour 3G cell information at that time. If it is determined that no call on the mobile device is connected (no path of 3-4), the method returns to step 3-1. If it is determined that the mobile device should initiate acquiring candidate cell information at that time (yes path of step 3-5), a further step 3-3 involves the mobile device initiating acquiring neighbour 3G cell information at that time. If it is determined that the mobile device should not initiate acquiring candidate cell information at that time (no path of step 3-5) the method returns to step 3-4. Once it is determined that the mobile device should initiate acquiring candidate cell information in step 3-3, a further step 3-6 involves the mobile device proceeding to acquire neighbour 3G cell information. Once the mobile device has acquired neighbour 3G cell information, a further step 3-7 involves determining a candidate 3G cell list.

After determination of the candidate 3G cell list in step 3-7, a further step 3-8 includes determining if a handover trigger occurs within a defined duration. If it is determined a handover trigger occurs within a defined duration (yes path of step 3-8), then the candidate 3G cell list information is furnished to the GANC in a handover information message, step 3-9, so that the handover procedure to the UTRAN cell can begin when appropriate. If it is determined a handover trigger does not occur within a defined duration (no path of step 3-8) then the method returns to step 3-3. Steps 3-3, 3-6 and 3-7 may be repeated to acquire any updated or changed neighbour cell information and thereby update the candidate 3G cell list from the last time the steps were performed.

Acquiring candidate cell information may include some or more of the following steps: extracting UARFCN and PCS information from SIB 11 and SIB 11Bis information to identify neighbouring cells; once neighbouring cells are identified, for at least one of the neighbouring cells, decoding information pertaining to the neighbouring cell using the extracted information from the SIB 11 and SIB 11Bis measuring signal strength of neighbour cells based on decoded information; and generating the list of candidate cells as a function of information determined about neighbouring cells.

Figure 4A:
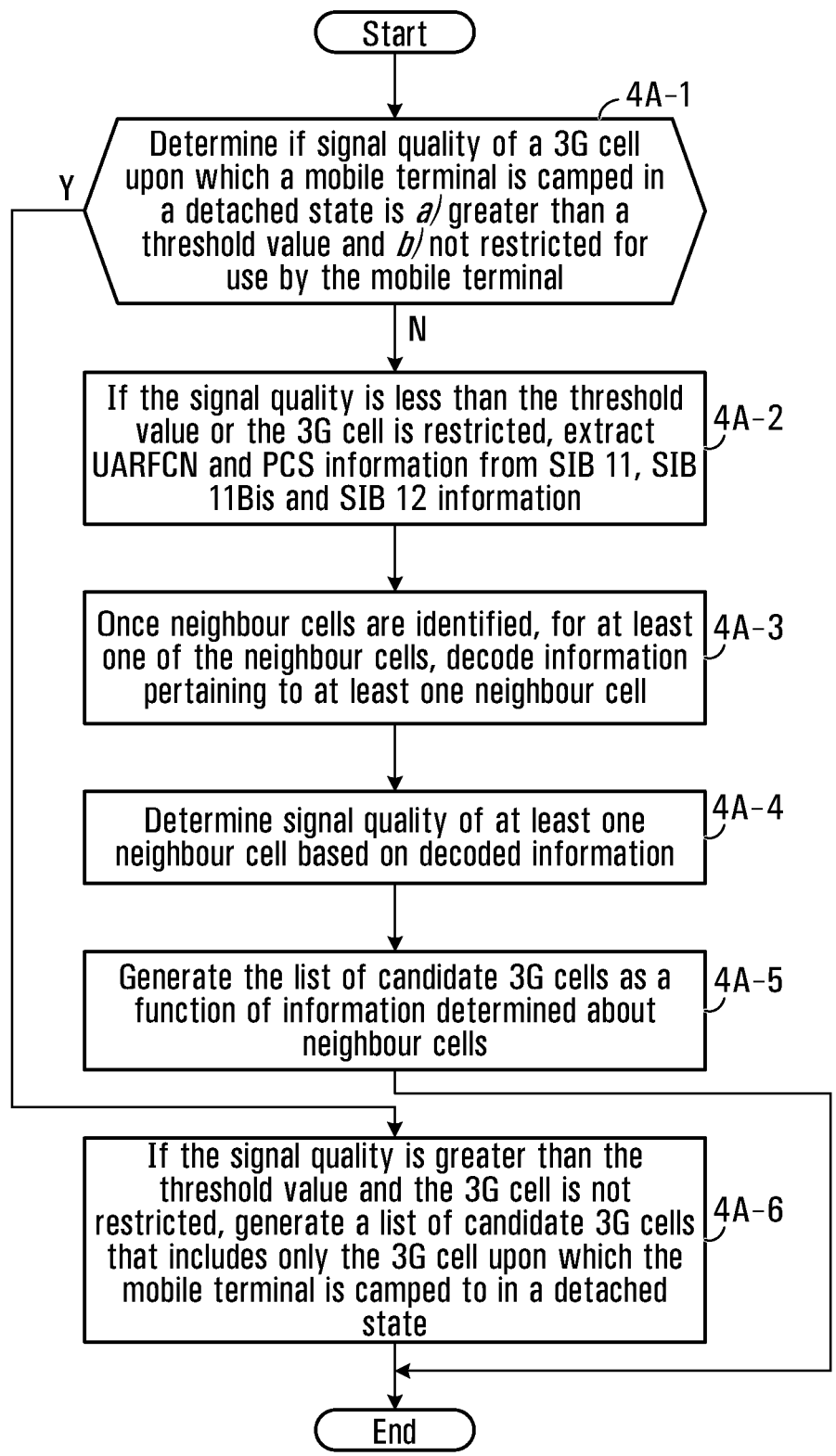
FIG. 4A is a flow chart illustrating a first example for generating handover information when handing over from a GAN to a UTRAN.

In some embodiments, acquiring candidate cell information may include other methods described herein, such as the examples of FIGS. 4A. 4B, 5, 6, 8 and 9.

In some embodiments the UTRAN AS, even though it is in a detached state with regard to a UTRAN cell, behaves as if it is in a connected state and performs one or more of autonomous intra-frequency measurements, inter-frequency measurements and inter-RAT measurements in an attempt to find neighbouring cells.

While the above paragraphs describe a 3G cell, more generally the description applies to any type of non-GAN network and more specifically a non-GAN cell in place of the 3G cell and procedures where technology specific cell broadcast messages are used to generate a candidate cell list. In some embodiments the non-GAN network is any one of a UTRAN, a GERAN, and a Long Term Evolution (LTE) network. The network that is not a GAN can employ any form of cell structure, for example, but not limited to, a macro cell structure, a pico cell structure or a femto cell structure.

Reducing Number of Neighbour Cells Based on Signal Quality Thresholds

The second technique may be used to aid in reducing the processing load on the mobile device. In some embodiments this technique potentially reduces the number of neighbour cells that are included in the candidate cell list on the basis of signal quality thresholds. Two example techniques of how the number of neighbour cells may be reduced for the sake of generating the candidate cell list are described below.

A first example applies a maximum signal quality threshold to information determined from information received and decoded regarding a 3G cell when the mobile device's 3G AS is in a detached state. For a situation in which a) a GAN related event indicating a handover may be imminent triggers the reporting of neighbour cells for a potential handover, b) the signal strength, such as the $E_c/N_o$ or Radio Signal Code Power (RSCP), of the 3G cell upon which the mobile device is camped in a detached state is above a certain threshold and c) the 3G cell is not restricted for use by the mobile device, then the mobile device may report only one cell as a candidate cell, namely the 3G cell upon which the mobile device is camped in a detached state. In such a scenario, processing power is saved as decoding of information regarding neighbouring cells is not performed if it is determined that the 3G cell upon which the mobile is camped in a detached state has a sufficient signal quality to handle a call that may need to be handed over from the GAN.

In some implementations, if the signal quality of the 3G cell falls below the maximum threshold or if the 3G cell becomes restricted, then the mobile device attempts to find information regarding additional neighbour cells and include at least some of the neighbour cells that are identified in the 3G candidate cell list.

In some implementations, the mobile station can adjust the threshold from operational experience. The mobile station can maintain a record of the level at which it was able to successfully handover to a cellular network, and using this historical knowledge it is possible for the mobile device to predict whether a certain level would be sufficient to successfully handover. In some embodiments, the maximum threshold can be dynamically adjusted by increasing or decreasing the maximum threshold.

FIG. 4A will now be referred to in describing a method according to the first example for determining 3G candidate cell list information which includes reducing the number of neighbour cells based on signal quality thresholds prior to generating the candidate cell list. Some examples of signal quality include, but are not limited to, $E_c/N_o$, Reference Signal Received Power (RSRP) and radio signal code power (RSCP).

A first step 4A-1 involves determining if the signal quality of a 3G cell upon which a mobile device is camped in a detached state is a) greater than a threshold value and b) not restricted for use by the mobile device.

If the signal quality is less than the threshold value or the 3G cell is a restricted cell for use by the mobile device (no path of 4A-1), a further step 4A-2 involves extracting UARFCN and PSC information from one or more of SIB 11 and SIB 11bis message blocks from the 3G cell upon which the mobile device is camped in a detached state for identifying neighbouring cells.

In a further step 4A-3, once one or more neighbour cells are identified, the mobile device proceeds to decode information pertaining to the at least one of the one or more neighbour cells. The information that is decoded may include, but not limited to, common pilot channel information (CPICH) information, MIB information and SIB information.

In some embodiments, if SIB 18 information is available to the mobile device, neighbour cells may be added to the neighbour cell list whose respective PLMN IDs match the ones provided in the SIB 18 information. SIB 18 information is an optional message block and not all network operators transmit this information in their networks. SIB 18 information may contain PLMN Identifiers (ID) of neighbour cells in 'Idle' state and 'Connected' state, or both. The PLMN ID contains MCC information and MNC information.

Another step 4A-4 involves, once a list of neighbour cells is identified as a function of the decoded information, determining a signal quality of at least one neighbour cell based on decoded information. In some embodiments determining a signal quality involves measuring signal strength.

A further step 4A-5 involves generating a 3G candidate cell list as a function of information determined about neighbour cells. The information may include information from the SIB 11 and SIB 11bis message blocks or measurements made of neighbour cells, or both. In embodiments in which SIB 18 information is available to the mobile device, once the mobile device receives the SIB 18 information, the mobile device can read PLMN IDs and add those cells in the 3G candidate cell list which have matching PLMN IDs. In some embodiments generating the 3G candidate cell list includes arranging the 3G candidate cells as a function of the measured signal quality. In some embodiments the signal quality may be signal strength. In some embodiments, the 3G candidate cells are arranged from strongest signal strength to weakest signal strength.

Referring back to step 4A-1, if the signal strength of the 3G cell upon which the mobile device is camped in a detached state is greater than the threshold value and the cell is not a restricted cell (yes path of 4A-1), a further step 4A-6 involves generating the 3G candidate cell list that includes only a single 3G cell, which is the 3G cell upon which the mobile device is camped in a detached state.

While the above paragraphs describe a 3G cell, more generally the description applies to any type of non-GAN network and more specifically a non-GAN cell in place of the 3G cell and procedures where technology specific cell broadcast messages are used to generate a candidate cell list. In some embodiments, the non-GAN network is any one of a UTRAN, a GERAN, and a Long Term Evolution (LTE) network. The network that is not a GAN can employ any form of cell structure, for example, but not limited to, a macro cell structure, a pico cell structure or a femto cell structure.

A second example of attempting to reduce processing in the mobile device involves excluding neighbour cells which have a signal quality below a minimum threshold value. In such an example the mobile device does not consider such neighbour cells for the candidate cell list. By restricting the number of neighbour cells that may be included in the candidate cell list, the mobile device may save time and reduce processing load because it does not waste time in decoding information of weak signal cells which may not be suitable for handover. For example, the mobile device may not need to decode Primary Common Control Physical Channel (PC-CPCH) information and MIBs and SIBS of cells with less than desirable signal quality.

In some embodiments the minimum threshold value is fixed. In some embodiments the minimum threshold value is dynamically adjustable. For example, if most of the neighbour cells have weak signal strengths, i.e. close to or below the minimum threshold then the mobile device may reduces the minimum threshold so that the candidate cell list contains two or more cells. Alternatively, the mobile device may increase the minimum threshold if several neighbour cells are available in the neighbourhood.

In some embodiments, instead of using a threshold associated with signal quality, the mobile device can fix the number of candidate cells to be included in the candidate cell list at N, where N is greater than or equal to 1, and select the N strongest cells to be included in the candidate list.

Figure 4B:
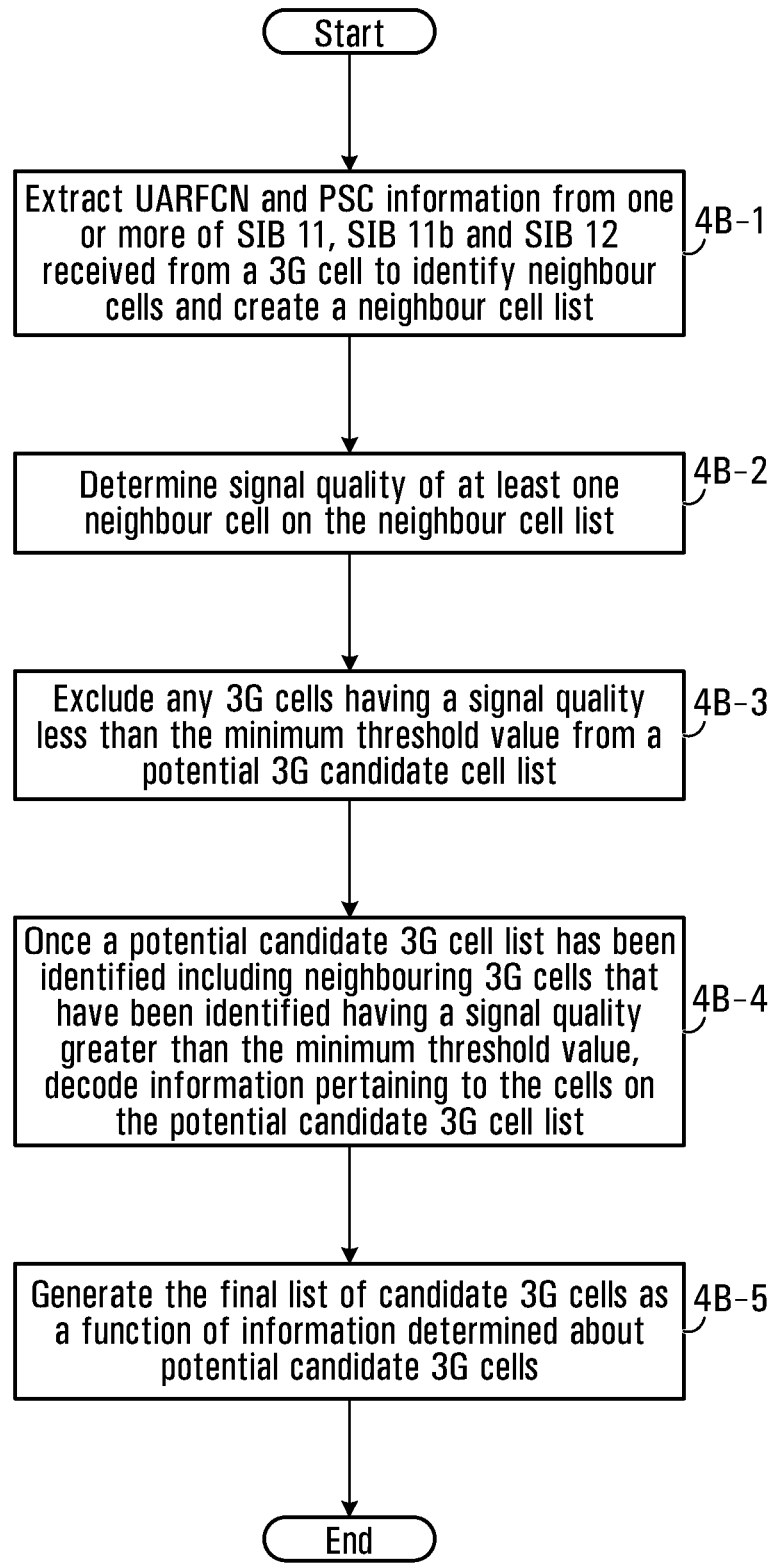
FIG. 4B is a flow chart illustrating a second example for generating handover information when handing over from a GAN to a UTRAN.

FIG. 4B will now be referred to in describing a method according to the second example of the second technique for determining candidate cell list information.

A first step 4B-1 involves extracting UARFCN and PSC information from the one or more of SIB 11 and SIB 11bis received from a 3G cell upon which the mobile device is camped in a detached state to identify neighbour cells and create a neighbour cell list including the 3G cell upon which the mobile device is camped in a detached state.

A second step 4B-2 involves determining a signal quality of at least one neighbour cell on the neighbour cell list. In some embodiments determining a signal quality involves measuring a signal strength.

A further step 4B-3 involves excluding any 3G cells having a signal quality less than the minimum threshold value from a potential candidate 3G cell list. In some embodiments this involves determining if the signal quality of the 3G cell upon which the mobile terminal is camped in detached state is less than the minimum threshold value.

A further step 4B-4 involves, once a list of potential candidate 3G cells has been identified in which each candidate 3G cell has a signal quality that is greater than the minimum threshold value, decoding information pertaining to the potential candidate 3G cells. This information may include, but is not limited to, CPICH information, MIB information and SIB information. In some embodiments, if SIB 18 information is available to the mobile device, neighbour cells may be included whose PLMN ID matches the one provided in the SIB 18 information.

Step 4B-5 involves generating a final candidate 3G cell list as a function of information determined about the potential candidate 3G cells. In some embodiments, generating the final candidate 3G cell list involves arranging the candidate 3G cells as a function of the measured signal quality of the individual candidate 3G cells. In some embodiments, the candidate 3G cells are arranged from strongest signal strength to weakest signal strength.

In some embodiments, the mobile device can use either of minimum or maximum threshold values in a manner that is generally consistent with the examples described above. In some embodiments, the mobile device can use both of minimum and maximum threshold values in a manner that is generally consistent with the examples described above.

In some embodiments, in order to avoid a situation in which signal quality fluctuations make it difficult to maintain a list of candidate 3G cells, appropriate threshold values may be selected taking into account a hysteresis type effect.

While the above paragraphs describe a 3G cell, more generally the description applies to any type of non-GAN network and more specifically a non-GAN cell in place of the 3G cell and procedures where technology specific cell broadcast messages are used to generate a candidate cell list. In some embodiments, the non-GAN network is any one of a UTRAN, a GERAN, and a Long Term Evolution (LTE) network. The network that is not a GAN can employ any form of cell structure, for example, but not limited to, a macro cell structure, a pico cell structure or a femto cell structure.

Excluding Restricted Cells

The third technique avoids including restricted cells in the candidate cell list. The mobile device examines restrictions on the neighbour cells before including them in the candidate cell list. Thus, the mobile device avoids reporting restricted cells, which are not suitable for handover as candidate cells.

Figure 5:
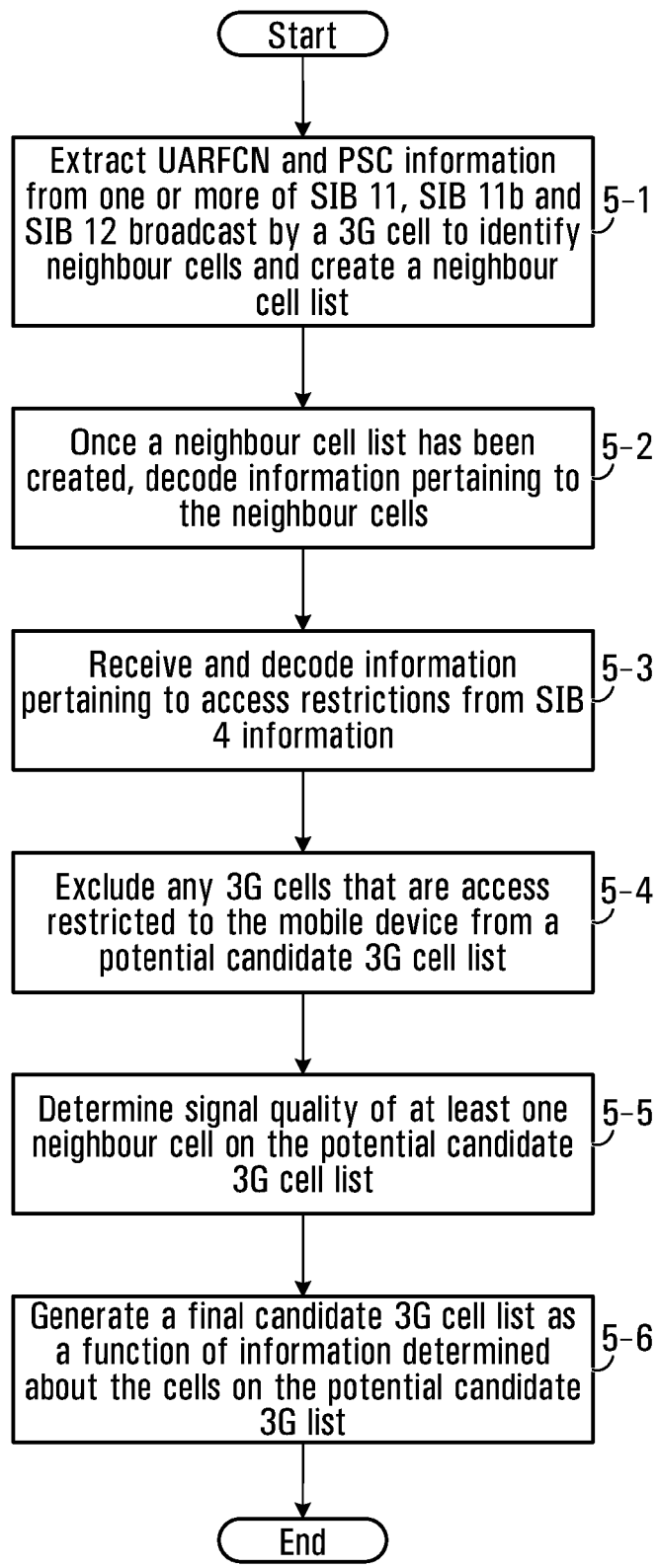
FIG. 5 is a flow chart illustrating an example of generating handover information when handing over from a GAN to a UTRAN.

FIG. 5 will now be referred to in describing an example method of excluding restricted neighbour cells in the candidate list.

A first step 5-1 involves extracting UARFCN and PSC information from one or more of SIB 11 and SIB 11bis broadcast by a 3G cell, upon which the mobile station is camped in a detached state, to identify neighbour cells and create a neighbour cell list.

A second step 5-2 involves, once a neighbour cell list has been created, decoding information pertaining to the neighbour cells for at least one of the neighbour cells. In some embodiments, the UARFCN and PSC information is used to decode information such as, but not limited to, CPICH information, MIB information and SIB information. In some embodiments, if SIB 18 information is available to the mobile device, neighbour cells may be added to the neighbour cell list in which the neighbour cell PLMN ID matches that provided in the SIB 18 information.

Another step 5-3 involves receiving and decoding SIB 3 information to determine access restrictions on the neighbour cells.

Step 5-4 involves excluding any 3G cells that are access restricted to the mobile device from a potential candidate 3G cell list. If it is determined that any of the neighbour 3G cells are restricted from use by the mobile device, then any such 3G cells are excluded in the potential candidate 3G cell list.

Another step 5-5 involves, once a list of potential candidate 3G cells is identified and information regarding those cells has been decoded or otherwise obtained, determining the signal quality of at least one neighbour cell on the potential candidate 3G cell list.

Step 5-6 involves generating a final candidate 3G cell list as a function of information determined about the cell on the potential candidate 3G cell list. In some embodiments, generating the final candidate 3G cell list involves arranging the candidate 3G cells as a function of the measured signal quality of the individual candidate 3G cells. In some embodiments, the candidate 3G cells are arranged from strongest signal strength to weakest signal strength.

While the above paragraphs describe a 3G cell, more generally the description applies to any type of non-GAN network and more specifically a non-GAN cell in place of the 3G cell and procedures where technology specific cell broadcast messages are used to generate a candidate cell list. In some embodiments, the non-GAN network is any one of a UTRAN, a GERAN, and a Long Term Evolution (LTE) network. The network that is not a GAN can employ any form of cell structure, for example, but not limited to, a macro cell structure, a pico cell structure or a femto cell structure.

Scanning to Supplement Neighbour Cell List

Regardless of the availability of the neighbour cell list (which may at least in part be generated using one or more of SIB 11 and SIB 11bis), the mobile device can attempt to find additional neighbour cells on its own by using frequency scanning techniques. In some situations, scanning by the mobile device may have a higher cost than a benefit provided by determining neighbour cells by scanning for the cells. In other words, the increased processing of performing the scanning may not necessarily be beneficial as there may be insufficient time to perform the scanning before a call is dropped due to rapid GAN signal strength degradation.

A particular example of when a mobile device may want to use scanning to supplement the neighbour cell list is when the mobile device is Out of Service (OOS) from cellular coverage and is in idle or connected state in GAN. When this occurs the mobile device is unable to obtain information from any neighbour cells when at its current location. The mobile device enters a cycle of performing foreground cellular search during which the mobile device is actively searching for neighbour cells, and back-off periods when the mobile device does not search for neighbour cells in an attempt to conserve power. In some embodiments, the back-off periods increase in duration if it is determined that the mobile device is still OOS. In some embodiments, when a generalized access network circuit switched (GAN CS) call is started, if the mobile device is OOS and in a back-off period, the mobile device terminates the back-off period and starts a cellular scan immediately. Immediately performing the cellular scan may increase the chances of finding a target cell and aid in preventing a dropped call. In some embodiments, the mobile device can enter into the back-off period again if no cell is found after a given time.

In some embodiments, when SIB information is available to the mobile device, the mobile device may attempt to match PLMN ID information received in the SIB 18 information with PLMN information obtained after the mobile device has scanned frequency bands, synchronized to a transmission slot and frame, estimated a neighbouring cell scrambling code, determined a signal quality from a neighbour cell and decode MIB and SIB information.

Figure 6:
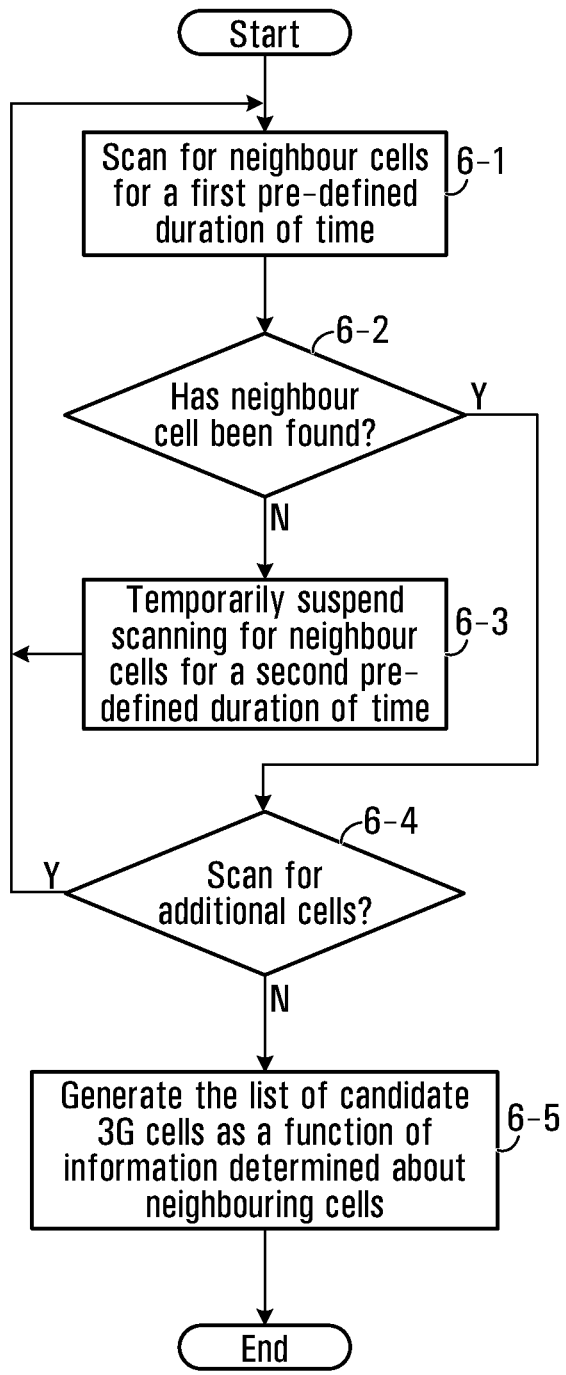
FIG. 6 is a flow chart illustrating another example of generating handover information when handing over from a GAN to a UTRAN.

An example of scanning for cells by the mobile device will now be described with reference to FIG. 6. A first step 6-1 involves scanning for neighbour cells for a first predefined duration of time. A second step 6-2 is a determining step where it is to be determined whether a neighbour cell has been found. If a neighbour cell is not found (no path of 6-2) then a further step 6-3 involves temporarily suspending scanning for neighbour cells for a second predefined period of time. Following step 6-3, at the end of the second predefined duration of time, the method returns to step 6-1 in which scanning is resumed. If a neighbour cell is found (yes path of 6-2) then a further step 6-4 involves a determining step in which it is to be determined if further scanning for additional cells is desired. If it is determined that no further scanning is to be performed (no path of 6-4), a further step 6-5 is generating the list of candidate cells as a function of information determined about neighbouring cells. In some embodiments, if this process is used in conjunction with other processes described within the application, generating the list of candidate cells may be performed as a function of information determined about neighbouring cells that have been identified from scanning and neighbours cells that may have been determined by one or more of the other processes. If it is determined that further scanning is to be performed (yes path of 6-4), the method returns to step 6-1 in which scanning is resumed.

While the above paragraphs describe a 3G cell, more generally the description applies to any type of non-GAN network and more specifically a non-GAN cell in place of the 3G cell and procedures where technology specific cell broadcast messages are used to generate a candidate cell list. In some embodiments, the non-GAN network is any one of a UTRAN, a GERAN, and a Long Term Evolution (LTE) network. The network that is not a GAN can employ any form of cell structure, for example, but not limited to, a macro cell structure, a pico cell structure or a femto cell structure.

Requesting Neighbour Cell Information from GANC

As discussed above, generating the 3G candidate cell list for handover from GAN to UTRAN typically takes a longer duration and more processing than generating a 2G candidate cell list. In some implementations, the following technique reduces some of the processing load from the mobile device by requesting information regarding neighbour cells from the GANC.

In response to an occurrence of a trigger for handover, the mobile device sends a message to the GANC to uniquely identify the UTRAN cell upon which the mobile device is camped in a detached state. In some embodiments, the message is referred to as a generalized access circuit switched resource (GA-CSR) DOWN LINK QUALITY INDICATION message. In some implementations the message may also include other information such as, but not limited to, LAC, Access Point ID, Tracking Area Code and PLMN ID. This information is readily available to the mobile device.

The GANC, in response to the message, coordinates with a network node (e.g. Serving Radio Network Controller (SRNC)) to establish neighbour cell information that can be returned to the mobile device. Following receipt of information defining non-restricted neighbour cells for the mobile device from the SRNC, the GANC replies to the mobile device. In some embodiments, the GANC sends the information back to the mobile device in a down link message, where down link is defined in a direction from GANC to the mobile device. In some embodiments the down link message is referred to as a GA-CSR NEIGHBOUR INFORMATION message.

Figure 7:
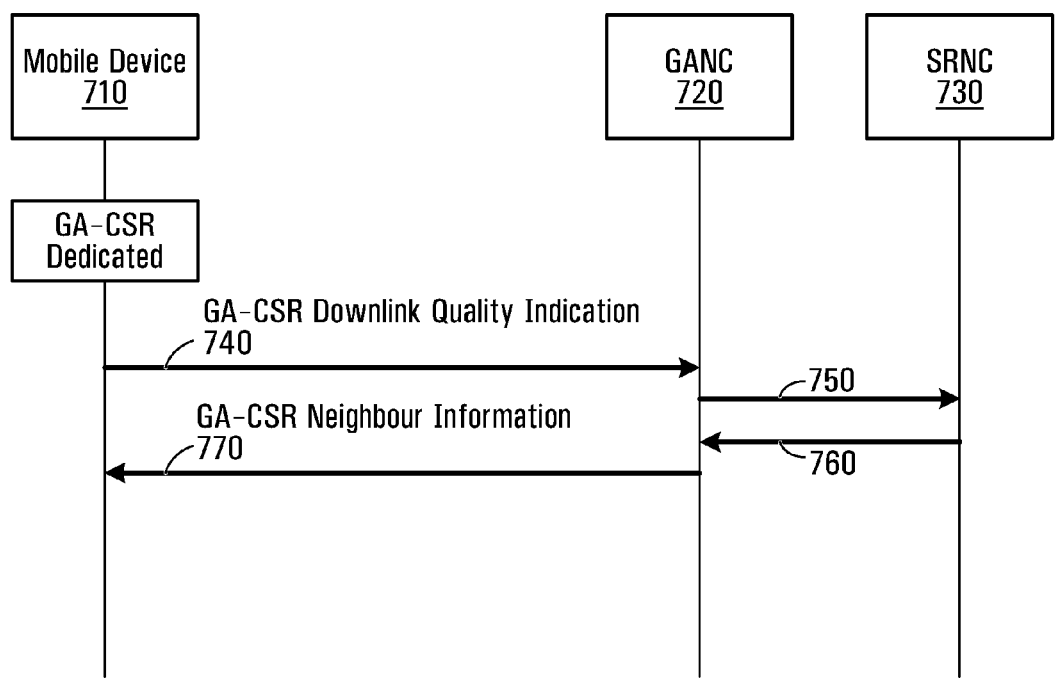
FIG. 7 is a signalling diagram illustrating signalling that may occur between a UE and GANC as part of arranging handing over from a GAN to a UTRAN.

FIG. 7 illustrates an example of signal flow between a mobile device 710, a GANC 720 and a SRNC 730. For mobile device 710, which is in a GA-CSR DEDICATED STATE, a first signal 740 is transmitted to GANC 720 in the form of a GA-CSR DOWN LINK QUALITY INDICATION message. GANC 720 transmits a second signal 750, a request message to SRNC 730, in order to obtain information regarding neighbour cells that the mobile device may be in proximity to and are non-restricted to the mobile device. SRNC 730 sends a third signal 760, a response message to GANC 720, describing one or more neighbour cells. GANC transmits a fourth signal 770, a response message to the GA-CSR DOWN LINK QUALITY INDICATION message, to mobile device 710 in the form of a GA-CSR NEIGHBOUR INFORMATION message.

In some implementations, the down link message from the GANC to the mobile device includes some of, but is not limited to, UARFCN, PSC, LAC, PLMN and Cell ID information of the neighbour cells. This information aids the mobile device to synchronize to the respective neighbour cells, measure signal strength and decode MIB and SIBS information and allow the mobile device to confirm that a neighbour cell is one that was identified in the down link message.

In some embodiments, instead of determining all the information for the candidate 3G cell list as is done in some of the other examples described above or below, the mobile device obtains a list of candidate 3G cells from the GANC. Having the potential candidate 3G cell list, the mobile device measures the signal strength for the identified neighbour cells.

In some implementations, the neighbour cell information provided to the mobile device by the GANC (after coordinating with the SRNC) contains only suitable cells for handover. For example the neighbour cell information does not include neighbour cells that are restricted or considered to be congested, for use by the mobile device. Having this information may save the mobile device processing time and energy, or both, as it may not have to decode information of restricted or congested neighbour cells.

In some embodiments, the GANC's ability to support such messages between the mobile device and the GANC is conveyed to the mobile device during registration of the mobile device with the GANC. In this manner the mobile device will know that the GANC has a capability to provide information regarding neighbour cells and can avoid sending a request message to GANCs that do not support such a capability.

Figure 8:
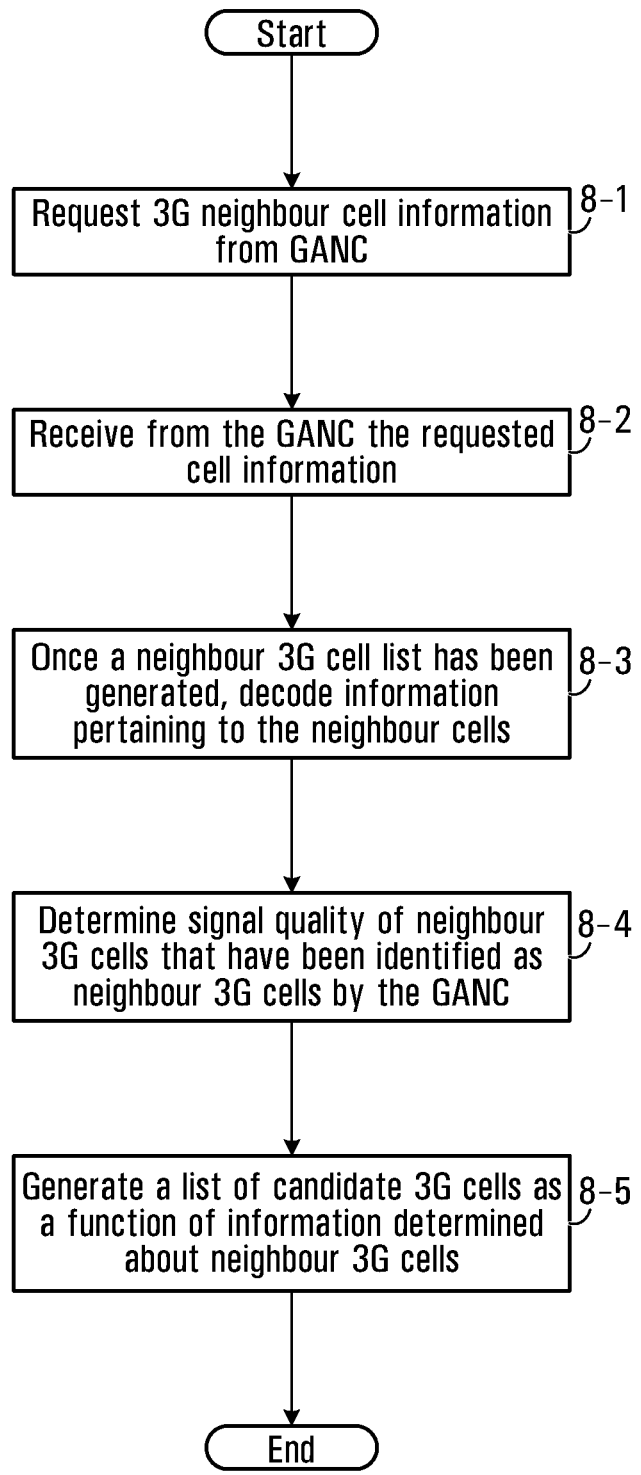
FIG. 8 is a flow chart illustrating an example of soliciting neighbour cell information from a GANC when arranging handing over from a GAN to a UTRAN.

FIG. 8 will now be referred to in describing an example of a method for soliciting neighbour cell information from the GANC and generating a candidate cell.

A first step 8-1 involves requesting 3G neighbour cell information from the GANC. In some embodiments this may include sending a message that includes an indication of a cause for having to handover from the GAN to the UTRAN cell and the UTRAN detached cell ID. In some embodiments, this message may be triggered because the downlink quality measured by the mobile device is below a desired threshold. In some embodiments the message is a GA-CSR DOWN LINK QUALITY INDICATION message.

A second step 8-2 involves receiving from the GANC the requested neighbour cell information. In some embodiments this may include receiving a GA-CSR NEIGHBOUR INFORMATION message. The GA-CSR NEIGHBOUR INFORMATION message may include information such as, but not limited to: UARFCN; PSC of the PLMN ID; LAC; and Cell ID of non-restricted cells.

Another step 8-3 involves once a neighbour cell list has been generated, decoding information pertaining to the neighbour cells. Decoding information may include decoding information pertaining to the candidate cells for which UARFCNs and primary scrambling code information is received, such as, but not limited to, CPICH information, MIB information and SIB information. Prior to decoding the information the mobile may synchronize to neighbour cells one by one. In some embodiments the mobile device may verify the Cell ID of each of the neighbour cells by reading SIB3 information.

Another step 8-4 involves, once a list of neighbour cells is identified and information regarding those cells has been decoded, or otherwise obtained, and verified, determining the signal quality of neighbour cells that have been identified as neighbour cells by the GANC.

Another step 8-5 involves generating a list of candidate 3G cells as a function of information determined about neighbouring 3G cells. For example, generating a list of candidate 3G cells as a function of information determined about neighbouring cells may involve generating a list of candidate 3G cells as a function of signal quality.

In some embodiments the candidate cell list is generated in which the candidate cells are arranged as a function of the signal quality. In some embodiments the candidate cell list is generated in which the candidate cells are arranged as a function of the signal strength. In some embodiments, the candidate cells are arranged from strongest signal strength to weakest signal strength.

While the above paragraphs describe a 3G cell, more generally the description applies to any type of non-GAN network and more specifically a non-GAN cell in place of the 3G cell and procedures where technology specific cell broadcast messages are used to generate a candidate cell list. In some embodiments the non-GAN network is anyone of a UTRAN, a GERAN, and a Long Term Evolution (LTE) network. The network that is not a GAN can employ any form of cell structure, for example, but not limited to, a macro cell structure, a pico cell structure or a femto cell structure.

Figure 9:
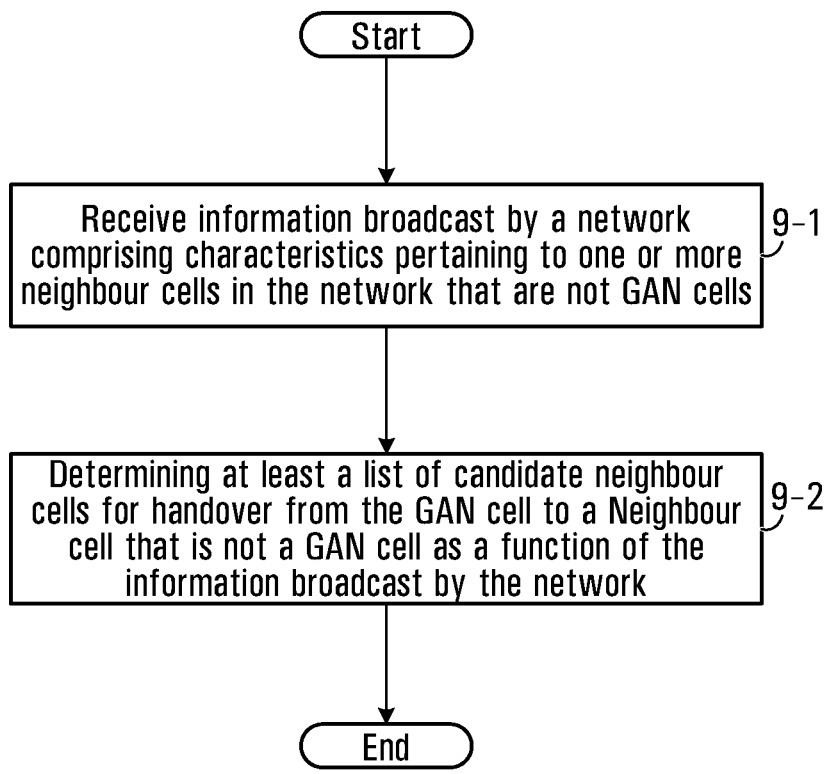
FIG. 9 is a flow chart illustrating another example of soliciting neighbour cell information from a GANC when arranging handing over from a GAN to a UTRAN.

Referring to FIG. 9, a broad example of a method for generating handover information when handing over from a GAN to a UTRAN involves, in a first step 9-1, receiving information broadcast by a network comprising characteristics pertaining to one or more telecommunication cells in the network that are not GAN cells. A second step 9-2 involves determining at least a list of candidate neighbour cells for handover from a generic access network (GAN) cell to a cell that is not a GAN cell as a function of the information broadcast by the network. In some embodiments, the network that is not a GAN is a UTRAN and the cell that is not a GAN cell is a 3G cell. In some embodiments, information broadcast by the network is information broadcast in one or more of: MIB, SIB 1, SIB 2, SIB4, SIB 11; SIB 11BIS; and SIB 18.

In some embodiments, the network that is not a GAN is a network other than a UTRAN network. In some embodiments, the cell that is not a GAN cell is a cell other than a 3G cell. The information broadcast by a network may include system broadcast messages that inform mobile devices about characteristics of a cell that are pertinent to a mobile device potentially using that cell to connect to a network. While connected to a GAN, a mobile device may be camped on a cell in a detached state that is not a GAN cell and receive system broadcast messages pertinent to the non-GAN cell or other neighbour non-GAN cells. It is to be understood that the various examples described above pertaining to determining a list of 3G candidate cells for handover from a GAN can generally apply to other non-GAN cells, where the UTRAN or 3G specific broadcast messages, such as the signalling block (SIB) information could be provided to the mobile in a manner supported by the particular non-GAN cell type in question.

In some embodiments, information broadcast by the network is information received by a GANC. Information received by the GANC may be information requested by the mobile device in an attempt to determine an identification of neighbour cells.

While FIGS. 3, 4A, 4B, 5, 6 and 8 have been described as individual methods, it is to be understood that two or more of the methods could be used in combination by a mobile device at any given time, as desired, simultaneously or in a serial manner, i.e. one method after another.

Furthermore, while a specific ordering of steps is illustrated in the examples of FIGS. 3, 4A, 4B, 5, 6 and 8, it is to be understood that modification of the order of the steps would be possible such that the intended result of the methods are obtained in a somewhat different arrangement of steps.

While above portions of the specification include particular examples of messages transmitted as part of example methods, such as GA-CSR UPLINK QUALITY INDICATION, GA-CSR DOWNLINK QUALITY INDICATION, GA-CSR HANDOVER INFORMATION, GA-RRC NEIGHBOR INFORMATION, GA-RRC DOWNLINK QUALITY INDICATION, GA-RRC RELOCATION INFORMATION messages, it is to be understood that these are not intended as a complete list of message types or to limit the scope of the invention. One skilled in the art would understand that other types of messages capable of transmitting the relevant described information that is desired to be transmitted may be used in place of the example messages described above.

GAN Iu Mode

As discussed above solutions for generating a candidate 3G cell list is also applicable for GAN Iu mode. The proposed solutions described above can be easily adapted for GAN Iu mode.

In GAN Iu mode, the GAN RAT is in a Generic Access Radio Resource Control (GA-RRC) CONNECTED state and UTRAN RAT is in a detached state. The handover is initiated by the mobile device in response to triggers such as, but not limited to the following: a) a local measurement of a GAN coverage signal quality is above/below a threshold; b) reception of GA-RRC UPLINK QUALITY INDICATION message indicating the quality has increased or decreased; c) reception of RTCP packets indicating poor uplink quality; and d) excessive loss or delay in the received RTP packets e) UTRAN becomes available, desirable (i.e. the signal quality is good enough for normal operation) or both and the mobile device is in a "cellular preferred" mode, meaning that UTRAN communication is a preferred network for communication.

In response to these triggers, the mobile device sends a message which is analogous to the handover information message in GAN A/Gb mode. In some implementations the message is referred to as a Generic Access Radio Resource Control (GA-RRC) RELOCATION INFORMATION message. In a similar fashion to the A/Gb mode, in GAN Iu mode the mobile device sends a list of candidate 3G cells in the message. In some embodiments the list of candidate 3G cells is arranged in descending order of signal quality in the GA-RRC RELOCATION INFORMATION message.

In a similar manner as that discussed above for requesting neighbour information from the GANC in A/Gb mode, in the GAN Iu mode neighbour information can also be requested from the GANC. In response to an occurrence of a trigger for handover, the mobile device sends a message to the GANC to uniquely identify the UTRAN cell upon which the mobile device is camped in a detached state. In some embodiments, the message is referred to as a Generalized Access Radio Resource Control (GA-RRC) DOWN LINK QUALITY INDICATION message. In some implementations the message may also include other information such as, but not limited to, LAC, Tracking Area Code and PLMN ID.

The GANC, in response to the message, coordinates with a network node (e.g. Serving Radio Network Controller (SRNC)) to establish neighbour cell information that can be returned to the mobile device. Following receipt of information defining non-restricted neighbour cells for the mobile device from the network node, the GANC replies to the mobile device. In some embodiments, the GANC sends the information back to the mobile device in a down link message, where down link is defined in a direction from GANC to the mobile device. In some embodiments the down link message is referred to as a GA-RRC NEIGHBOUR INFORMATION message.

Figure 10:
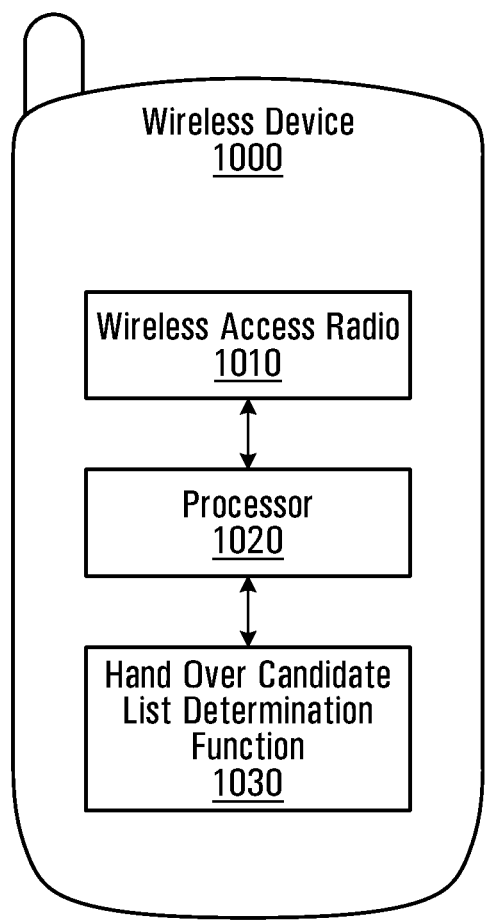
FIG. 10 is a block diagram of an example mobile device according to an implementation described herein.

Referring now to FIG. 10, shown is a block diagram of an example wireless device 1000 adapted to communicate using circuit switched and packet switched communications separately or simultaneously. The wireless device 1000 has a processor 1020 coupled to a wireless access radio 1010. The wireless access radio 1010 is broadly considered to be configured to communicate with at least both GAN and UTRAN networks. In some embodiments, the wireless access radio may be implemented as more than one wireless access radio, each one configured to access a different type of network. The wireless device may also have a Handover Candidate List Determination Function 1030 that is configured to operate in a manner consistent with the methods described above. Handover Candidate List Determination Function 1030, while illustrated as a single functional block in FIG. 10, may also be considered to have multiple sub-components, each sub-component configured to perform in a manner consistent with one or more of the example methods described above in FIGS. 3, 4A, 4B, 5, 6, 8 and 9. In some embodiments the wireless device 1000 is a multi-mode mobile wireless device.

In operation, the wireless device 1000 is adapted to communicate wirelessly over multiple types of wireless communication networks, for example a Universal Telecommunications Radio Access Network (UTRAN) network and a Generic Access Network (GAN), such as a Wi-Fi network (for example, as shown in FIG. 1), using the wireless access radio 1010. The wireless device 1000 is adapted to communicate using circuit switched and packet switched communications separately or simultaneously. In some embodiments, wireless access radio 1010 is configured to receive information broadcast by a network comprising characteristics pertaining to one or more telecommunication cells in the network. In some embodiments wireless access radio 1010 is configured to transmit to and receive from a GANC. In some embodiments, the processor 1020 is configured to execute the Handover Candidate List Determination Function 1030. The Handover Candidate List Determination Function 1030 is configured to determine a list of handover candidates for handover from a GAN to a UTRAN as a function of the information broadcast by the network. In some embodiments, information broadcast by the network used by the Handover Candidate List Determination Function 1030 is information broadcast in one or more of: SIB 11; SIB 11BIS; and SIB 18. In some embodiments, information broadcast by the network used by the Handover Candidate List Determination Function 1030 is information received by a GANC.

The Handover Candidate List Determination Function 1030 can be implemented using one of software, hardware, and firmware, or a suitable combination thereof. For example, application specific integrated circuits (ASIC) or field programmable gate arrays (FPGA) may be used to implement the function in hardware. To implement the function in software, in some embodiments, a microprocessor may be capable of executing computer readable program code instructions.

The device of FIG. 10 shows only functionality relevant to the aspects described herein. It is to be understood that practical implementations would include additional functionality to that shown.

Another Wireless Device

Figure 11:
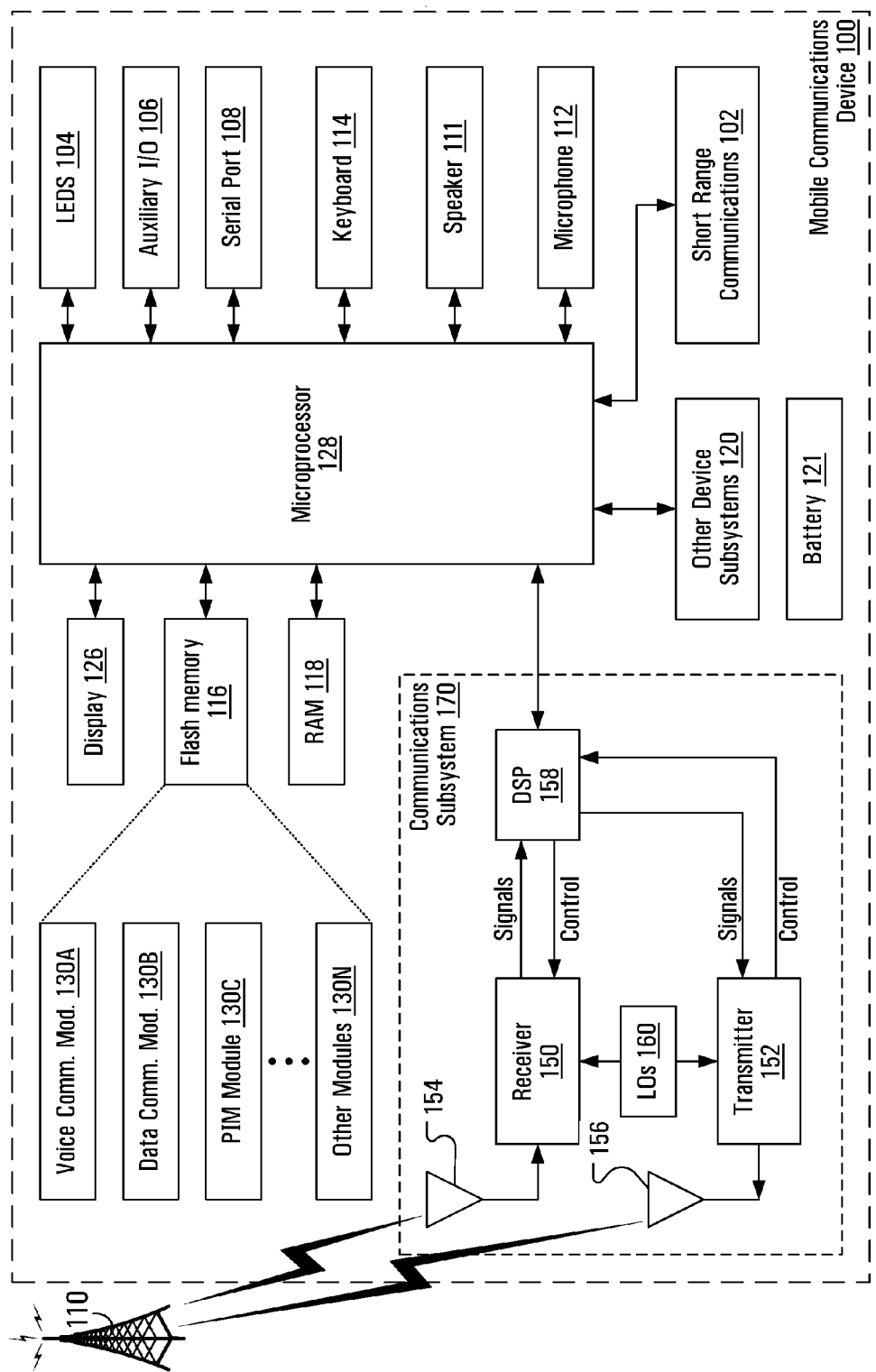
FIG. 11 is a block diagram of another wireless device.

Referring now to FIG. 11, shown is a block diagram of another wireless device 100 that may implement any of the wireless device methods described herein. The wireless device 100 is shown with specific components for implementing features described above, for example those generally illustrated in FIGS. 2, 3, 4A, 4B, 5, 6, 7, 8 and 9. It is to be understood that the wireless device 100 is shown with very specific details for exemplary purposes only.

A processing device (a microprocessor 128) is shown schematically as coupled between a keyboard 114 and a display 126. The microprocessor 128 is a type of processor with features similar to those of the processor 520 of the wireless device 500 shown in FIG. 9. The microprocessor 128 controls operation of the display 126, as well as overall operation of the wireless device 100, in response to actuation of keys on the keyboard 114 by a user.

The wireless device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the wireless device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The wireless device 100 may have a battery 121 to power the active elements of the wireless device 100. The wireless device 100 is in some embodiments a two-way radio frequency (RF) communication device having voice and data communication capabilities. In addition, the wireless device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 100 may also be stored to the RAM 118.

The microprocessor 128, in addition to its operating system functions, enables execution of software applications on the wireless device 100. A predetermined set of software applications that control basic device operations, such as a voice communications module 130A and a data communications module 130B, may be installed on the wireless device 100 during manufacture. In addition, a personal information manager (PIM) application module 130C may also be installed on the wireless device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. In some embodiments, the communication subsystem 170 includes a separate antenna arrangement (similar to the antennas 154 and 156) and RF processing chip/block (similar to the Receiver 150, LOs 160 and Transmitter 152) for each RAT, although a common baseband signal processor (similar to DSP 158) may be used for baseband processing for multiple RATs. The specific design and implementation of the communication subsystem 170 is dependent upon the communication network in which the wireless device 100 is intended to operate. For example, the communication subsystem 170 of the wireless device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1X and 1x EV-DO. The communication subsystem 170 may also be designed to operate with an 802.11 Wi-Fi network, and/or an 802.16 WiMAX network. Other types of data and voice networks, both separate and integrated, may also be utilized with the wireless device 100.

Network access may vary depending upon the type of communication system. For example, in the Mobitex™ and DataTAC™ networks, wireless devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the wireless device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the wireless device 100. In addition, the display 126 may also be utilized in voice communication mode, for example, to display the identity of a calling party, the duration of a voice call, or other voice call related information.

The short-range communications subsystem 102 enables communication between the wireless device 100 and other proximate systems or devices, which need not necessarily be similar devices. For example, the short range communications subsystem may include an infrared device and associated circuits and components, or a Bluetooth communication module to provide for communication with similarly-enabled systems and devices.

It should be understood that as used herein, terms such as coupled, connected, electrically connected, in signal communication, and the like may include direct connections between components, indirect connections between components, or both, as would be apparent in the overall context of a particular embodiment. The term coupled is intended to include, but not be limited to, a direct electrical connection.

Numerous modifications and variations of the present application are possible in light of the above teachings. It is therefore to be understood that within the scope of the appended claims, the embodiments of the application may be practised otherwise than as specifically described herein.

The invention claimed is:

1. A method for use in a mobile device comprising:
    when the mobile device is connected to a generic access network (GAN) cell, receiving information comprising characteristics pertaining to one or more neighbour cells in a network that are not GAN cells;
    determining at least a list of candidate neighbour cells for handover from the GAN cell to a cell that is not a GAN cell as a function of the information, the determining comprising performing at least one of:
        reducing processing load of the mobile device directed to generating the list, and
        performing at least some of the processing load of the mobile device directed to generating the list prior to a trigger initiating handover.

2. The method of claim 1 wherein determining at least a list of candidate neighbour cells for handover from the GAN cell to a cell that is not a GAN cell as a function of the information comprises determining at least a list of candidate 3G cells for handover from the GAN cell to a cell that is not a GAN cell as a function of the information.

3. The method of claim 2 wherein determining at least a list of candidate 3G cells for handover comprises:
    reducing the number of neighbour cells available to be included in the list of candidate 3G cells based on signal quality of the neighbour cells.

4. The method of claim 3 further comprising:
    extracting UTRAN absolute radio frequency channel number (UARFCN) information and primary scrambling code (PSC) information from System Information Block (SIB) 11 and SIB 11bis broadcast by at least one 3G cell to identify neighbour cells and create a neighbour cell list;
    determining signal quality of at least one neighbour cell on the neighbour cell list;
    excluding any 3G cells having a signal quality less than the minimum threshold value from a potential 3G candidate cell list;
    once a potential candidate 3G cell list has been identified comprising neighbouring 3G cells that have been identified having a signal quality greater than the minimum threshold value, decoding information pertaining to the cells on the potential candidate 3G cell list;
    generating the list of candidate 3G cells as a function of information determined about potential candidate 3G cells.

5. The method of claim 2 further comprising:
    determining if signal quality of a 3G cell upon which the mobile device is camped in a detached state is a) greater than a threshold value and b) not restricted for use by the mobile terminal;
    when the signal quality is less than the threshold value or the 3G cell is restricted for use by the mobile terminal:
        extracting UTRAN absolute radio frequency channel number (UARFCN) information and primary scrambling code (PSC) information from SIB 11 and SIB 11Bis broadcast by the network;
        once neighbour cells are identified, for at least one of the neighbour cells, decoding information pertaining to the at least one neighbour cell;
        determining signal quality of the at least one neighbour cell based on decoded information; and
        generating the list of candidate 3G cells as a function of information determined about the at least one neighbour cell; and
    when the signal quality is greater than the threshold value and the 3G cell is not restricted, generating the list of candidate 3G cells that includes only the 3G cell upon which the mobile device is camped in a detached state.

6. The method of claim 2 wherein determining at least a list of candidate 3G cells for handover comprises:
    reducing the number of neighbour cells available to be included in the list of candidate 3G cells based on a determination of whether a neighbour cell is restricted from use by the mobile device.

7. The method of claim 6 further comprising:
    extracting UTRAN absolute radio frequency channel number (UARFCN) information and primary scrambling code (PSC) information from SIB 11 and SIB 11Bis received from the 3G cell upon which the mobile device is camped in a detached state to identify neighbour cells and create a neighbour cell list;
    once a neighbour cell list has been created, decoding information pertaining to the neighbour cells; receiving and decoding information pertaining to access restrictions from SIB 3 information;
    excluding any 3G cells that are restricted to access the mobile device from a potential candidate 3G cell list;
    determining signal quality of at least one neighbour cell on the potential candidate 3G cell list;
    generating the candidate 3G cell list as a function of information determined about the cells on the potential candidate 3G cell list.

8. The method of claim 2 further comprising:
    determining if a mobile device is being used;
    determining if the mobile device should initiate acquiring neighbour 3G cell information at that time;
    if it is determined that the mobile device should initiate acquiring neighbour 3G cell information, initiating acquiring neighbour 3G cell information at that time; and
    determining the candidate 3G cell list based on the acquired 3G cell information.

9. The method of claim 8 further comprising:
    determining if a handover trigger occurs within a defined duration;
        when a handover trigger occurs within a defined duration furnishing the candidate 3G cell list to the Generic Access Network Controller (GANC) in a handover information message;

when a handover trigger does not occur within a defined duration repeating the initiating acquiring neighbour 3G cell information for any updates from the previous acquisition of neighbour 3G cell information; and determining the candidate 3G cell list based on the updated acquired 3G cell information.

10. The method of claim 2 further comprising:

performing a background cell scan to find neighbour 3G cells;

once neighbour 3G cells are identified, for at least one of the neighbour 3G cells, decoding information pertaining to the at least one neighbour 3G cell;

generating the list of candidate 3G cells as a function of information determined about the at least one neighbour 3G cell.

11. The method of claim 10, further comprising:

if a neighbour 3G cell is not discovered during a first predetermined duration, temporarily suspending performing the background cell scan for neighbour 3G cells for a second predetermined duration; and upon expiry of the second predetermined duration, resume performing the background cell scan to find neighbour 3G cells.

12. The method of claim 2 wherein receiving information comprising characteristics pertaining to one or more neighbour cells comprises:

the mobile device requesting the information from a GAN controller (GANC);

receiving the information from the GANC.

13. The method of claim 12 wherein requesting the information comprises sending a message that uniquely identifies a UTRAN cell upon which the mobile device is camped in a detached state.

14. The method of claim 12 further comprising:

generating a neighbour 3G cell list based at least in part on the information received from the GANC;

decoding information pertaining to the neighbour 3G cells;

determining signal quality of neighbour 3G cells that have been identified as neighbour 3G cells by the GANC;

generating a list of candidate 3G cells as a function of information determined about neighbour 3G cells.

15. The method of claim 2 wherein determining at least a list of 3G candidate cells for handoff occurs as a result of receiving:

a) local measurements of GAN coverage signal quality are above or below a predetermined threshold;
b) reception of a message indicating the uplink quality is below a desired threshold;
c) reception of one more Real-Time Control Protocol (RTCP) packets indicating a poor uplink quality;
d) excessive loss or delay in received Real-time Transport Protocol (RTP) packets; and
e) UTRAN becomes available, desirable or both and the mobile device is in a "cellular preferred" mode.

16. A mobile device comprising:

at least one wireless access radio configured to:

receive information broadcast by at least a generic access network (GAN) and a network that is not a GAN comprising characteristics pertaining to one or more telecommunication cells in the network that is not a GAN cell;

at least one processor configured to:

determine a list of candidate cells for handover from a GAN cell to a cell that is not a GAN cell as a function of the information broadcast by at least one of the GAN and the network that is not a GAN, the at least one processor configured to perform at least one of:

reduce processing load of the mobile device directed to generating the list, and perform at least some of the processing load of the mobile device directed to generating the list prior to a trigger initiating handover.

17. The mobile device of claim 16 wherein the network that is not a GAN is a UTRAN network and the cell that is not a GAN cell is a 3G cell of the UTRAN network.

18. The mobile device of claim 17, wherein the mobile device is further configured to:

perform background cell scans to find neighbouring cells;

if a neighbour 3G cell is not discovered during a first predetermined duration, temporarily suspending performing the background cell scan for neighbour 3G cells for a second predetermined duration; and upon expiry of the second predetermined duration, resume performing the background cell scan to find neighbour 3G cells;

once neighbouring cells are located, for at least one of the neighbouring cells, the processor is configured to:

decode information pertaining to the neighbouring cell; and generate the list of candidate cells as a function of information determined about neighbouring cells.

19. The mobile terminal of claim 17 wherein the list of candidate cells for handoff occurs as a result of the mobile terminal receiving:

a) local measurements of GAN coverage signal quality are above or below a predetermined threshold;
b) reception of a message indicating the uplink quality is below a desired threshold;
c) reception of one more Real-time Control Protocol (RTCP) packets indicating a poor uplink quality;
d) excessive loss or delay in received Real-time Transport Protocol (RTP) packets; and
e) UTRAN becomes available, desirable or both and the mobile device is in a "cellular preferred" mode.

20. The mobile terminal of claim 17 wherein the at least one wireless access radio is configured to provide a list of candidate cells for handoff to a GAN controller (GANC) in a handover information message.

* * * * *